(12) United States Patent
Kawecki, III

(10) Patent No.: US 10,353,898 B2
(45) Date of Patent: *Jul. 16, 2019

(54) SYSTEMS AND METHODS FOR ENHANCING USER DATA DERIVED FROM DIGITAL COMMUNICATIONS

(71) Applicant: CAY BAXIS HOLDINGS, LLC, New Haven, CT (US)

(72) Inventor: Walter J. Kawecki, III, Branford, CT (US)

(73) Assignee: CAY BAXIS HOLDINGS, LLC, New Haven, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 15/292,104

(22) Filed: Oct. 12, 2016

(65) Prior Publication Data

US 2017/0031992 A1 Feb. 2, 2017

Related U.S. Application Data

(63) Continuation of application No. 15/134,375, filed on Apr. 20, 2016, now Pat. No. 9,471,932, which is a
(Continued)

(51) Int. Cl.
*G06Q 30/02* (2012.01)
*G06F 16/23* (2019.01)
(Continued)

(52) U.S. Cl.
CPC ...... *G06F 16/2455* (2019.01); *G06F 16/2379* (2019.01); *G06F 16/24575* (2019.01);
(Continued)

(58) Field of Classification Search
None
See application file for complete search history.

(56) References Cited

U.S. PATENT DOCUMENTS 6,026,397 A 2/2000 Sheppard
6,055,573 A 4/2000 Gardenswartz
(Continued)

FOREIGN PATENT DOCUMENTS

EP 0823100 A1 10/1996
EP 0998712 A1 1/1999
(Continued)

OTHER PUBLICATIONS

Email Marketing API date unknown [captured on Archive.org on Oct. 12, 2011], activecampaign.com, https://web-beta.archive.org/web/20111012081257/http://www.activecampaign.com/api/.*
(Continued)

*Primary Examiner* — Jason G Liao
(74) *Attorney, Agent, or Firm* — Fisherbroyles, LLP

(57) ABSTRACT

A computer-implemented method for enhancing and utilizing user data derived from digital interactions includes receiving user submission data comprising records generated by input into a client side application interface by a first user on a first computing device and transmitted from the first computing device to the aggregation point via at least one of a data transmission service and a data transmission provider. The method includes generating a first dataset associated with the first user, generating a data model based on data in the first dataset and one or more correlations based on attributes in the first dataset, and generating a modeled dataset based on the data model.

29 Claims, 16 Drawing Sheets

US 10,353,898 B2
Page 2

Related U.S. Application Data continuation of application No. 14/879,063, filed on Oct. 8, 2015, now Pat. No. 9,348,862, which is a continuation of application No. 14/079,521, filed on Nov. 13, 2013, now Pat. No. 9,177,067, which is a continuation of application No. PCT/US2013/068354, filed on Nov. 4, 2013.

(60) Provisional application No. 61/722,231, filed on Nov. 4, 2012.

(51) Int. Cl.
- G06F 16/28 (2019.01)
- G06F 16/2455 (2019.01)
- G06F 16/2457 (2019.01)
- G06F 16/9535 (2019.01)

(52) U.S. Cl.
CPC ........ *G06F 16/285* (2019.01); *G06F 16/9535* (2019.01); *G06Q 30/0254* (2013.01); *G06Q 30/0255* (2013.01)

(56) References Cited

U.S. PATENT DOCUMENTS

| | | | |
|---|---|---|---|
| 6,161,130 A * | 12/2000 | Horvitz | G06F 17/30707 707/999.005 |
| 6,374,237 B1 | 4/2002 | Reese | |
| 6,748,426 B1 | 6/2004 | Shaffer | |
| 6,941,376 B2 | 9/2005 | Mitchell | |
| 7,167,907 B2 | 1/2007 | Shaffer | |
| 7,243,075 B1 | 7/2007 | Shaffer | |
| 7,260,837 B2 | 8/2007 | Abraham | |
| 7,584,223 B1 | 9/2009 | Pinkas | |
| 7,765,563 B2 | 7/2010 | Bauminger | |
| 7,797,319 B2 | 9/2010 | Piedmonte | |
| 7,809,709 B1 | 10/2010 | Harrison, Jr. | |
| 7,818,290 B2 | 10/2010 | Davis | |
| 7,873,376 B2 | 1/2011 | Coelho | |
| 7,966,374 B2 | 6/2011 | Huynh | |
| 8,051,132 B2 | 11/2011 | Hewes | |
| 8,150,934 B2 | 4/2012 | Lablanc | |
| 8,156,183 B2 | 4/2012 | Polis | |
| 8,171,077 B2 | 5/2012 | Huynh | |
| 8,175,624 B2 | 5/2012 | Philbin | |
| 8,250,150 B2 | 8/2012 | Beck | |
| 8,255,247 B2 | 8/2012 | Messer | |
| 8,281,037 B2 | 10/2012 | Julia | |
| 8,301,801 B2 | 10/2012 | Lu | |
| 8,302,069 B1 | 10/2012 | Hosmer | |
| 8,346,660 B2 | 1/2013 | Reardon | |
| 8,370,200 B2 | 2/2013 | Golden | |
| 8,396,932 B2 | 3/2013 | Pattekar | |
| 8,417,715 B1 * | 4/2013 | Bruckhaus | G06F 17/30994 705/26.1 |
| 8,527,450 B2 | 9/2013 | Jain | |
| 8,606,720 B1 | 12/2013 | Baker | |
| 8,626,705 B2 | 1/2014 | Barrett | |
| 8,775,263 B2 | 7/2014 | Killoran, Jr. | |
| 8,849,699 B2 | 9/2014 | Durvasula et al. | |
| 8,868,444 B2 | 10/2014 | Morris | |
| 2003/0033190 A1 | 2/2003 | Shan | |
| 2005/0055275 A1 | 3/2005 | Newman | |
| 2005/0114881 A1 | 5/2005 | Philyaw | |
| 2006/0229853 A1 | 10/2006 | Evans | |
| 2006/0265325 A1 | 11/2006 | Fajardo | |
| 2006/0277093 A1 | 12/2006 | Barnhouse | |
| 2007/0038516 A1 | 2/2007 | Apple | |
| 2007/0174453 A1 | 7/2007 | Donoho | |
| 2007/0255645 A1 | 11/2007 | Morris | |
| 2008/0015927 A1 | 1/2008 | Ramirez | |
| 2008/0208781 A1 * | 8/2008 | Snyder | G06F 19/34 706/20 |
| 2009/0070257 A1 | 3/2009 | Csoka | |
| 2009/0192873 A1 | 7/2009 | Marble | |
| 2010/0010886 A1 | 1/2010 | Flynn, Jr. | |
| 2010/0169232 A1 | 7/2010 | Wikström | |
| 2011/0077998 A1 | 3/2011 | Yan | |
| 2011/0154305 A1 | 6/2011 | LeRoux | |
| 2011/0185024 A1 | 7/2011 | Ramarao | |
| 2011/0295749 A1 | 12/2011 | Scalisi | |
| 2011/0302022 A1 | 12/2011 | Fordyce, III | |
| 2012/0047217 A1 | 2/2012 | Hewes | |
| 2012/0089521 A1 | 4/2012 | Abrevaya | |
| 2012/0209931 A1 | 8/2012 | Antell | |
| 2012/0278395 A1 | 11/2012 | Garcia | |
| 2013/0179347 A1 | 7/2013 | Soderstrom | |
| 2013/0232540 A1 | 9/2013 | Saidi | |
| 2013/0246259 A1 | 9/2013 | Dessert | |
| 2013/0246296 A1 | 9/2013 | Sierra | |

FOREIGN PATENT DOCUMENTS

| | | |
|---|---|---|
| EP | 1401181 A1 | 3/2004 |
| EP | 1214693 B1 | 1/2006 |
| GB | 2373361 A | 9/2002 |

OTHER PUBLICATIONS

Duda et al., Pattern Classification 2001, John Wiley & Sons, $2^{nd}$ ed., p. 1-17.*

Schreiber, Correlation Dimension Jan. 6, 1999, mpg.de, https://www.pks.mpg.de/~tisean/TISEAN_2.1/docs/chaospaper/node30.html.*

Mukaka, A guide to appropriate use of Correlation coefficient in medical research Sep. 2012, Malawi Medical Journal, pp. 69-71.*

Kanjilal, Exploring the MVC, MVP, and MVVM design patterns May 25, 2015, infoworld.com, https://www.infoworld.com/article/2926003/microsoft-net/exploring-the-mvc-mvp-and-mvvm-design-patterns.html.*

Vaz et al., Conventional and Non-Conventional Data Modeling 2013, IGI-Global, https://www.igi-global.com/chapter/conventional-non-conventional-data-modeling/77966.*

Lewis, A Star Schema Model for Narrative Data Jul. 21, 2005, BeyeNETWORK, http://www.b-eye-network.com/view/1196.*

Navathe et al., Toward Intelligent Integration of Heterogeneous Information Services Mar. 1996, Proceedings of the Sixth International Hong Kong Computer Society Database Workshop on Database Reengineering and Interoperability, p. 276.*

2.1.3 a) The common functions of an operating system date unknown [captured on Jul. 31, 2016 by archive.org], OCR GCSE Computing https://web.archive.org/web/20160731112323/http://theteacher.info/websites/gcse_comp/WebPages/A451_CompSys/213_Software/Software/a/a.html.*

Data Modeling & Data Mining date unknown [captured on Apr. 7, 2013 by archive.org], OptimizationGroup, https://web.archive.org/web/20130407045335/http://www.optimizationgroup.com/methods/data-modeling-data-mining/.*

Tunali, What are the most popular clustering algorithms? Aug. 13, 2010, quora.com, https://www.quora.com/What-are-the-most-popular-clustering-algorithms.*

Farina et al., Rulemaking in 140 Characters or Less: Social Networking and Public Participation in Rulemaking 2010, Cornell Law School, Cornell Law School research paper No. 010-011, https://kb.osu.edu/bitstream/handle/1811/72614/ISJLP_V1N1_111.pdf.*

Stewart Shulman, The Internet Still Might (But Probably Won't) Change Everything 2005, I/S: A Journal of Law and Policy for the Information Society, vol. 1 Iss. 1, pp. 111-145.*

About Us date unknown [captured Feb. 22, 2019], EPA, https://www.fdms.gov/fdms/public/aboutus.*

Rules of Practice Before the Board of Patent Appeals and Interferences in Ex Parte Appeals; Request for Comments on Potential Modifications to Final Rule and Notice of Roundtable During Comment Period Dec. 22, 2009, Office of the Federal Register, vol. 74 No. 244, pp. 67987-68004.*

Joe Sirianni "Paypal Mobile Is Making It Easier for You to Donate to Your Favorite Charity", Jan. 15, 2011, http://www.talkandroid.com/26825-paypal-mobile-is-making-it-easier-for-you-to-donate-toyourfavorite-charity/.

(56) References Cited

OTHER PUBLICATIONS

Blumenstock et al. "Charity and Reciprocity in Mobile Phone-Based Giving", 2011 Job Market Paper.
International Search Report and Written Opinion received in PCT Application No. PCT/US2013/068354 dated Jul. 8, 2014.

* cited by examiner

SYSTEMS AND METHODS FOR ENHANCING USER DATA DERIVED FROM DIGITAL COMMUNICATIONS

CROSS REFERENCE TO RELATED APPLICATIONS

This application is a continuation of U.S. patent application Ser. No. 15/134,375, titled "SYSTEMS AND METHODS FOR ENHANCING USER DATA DERIVED FROM DIGITAL COMMUNICATIONS" and filed 20 Apr. 2016, which is a continuation of U.S. patent application Ser. No. 14/879,063, titled "SYSTEMS AND METHODS FOR ENHANCING USER DATA DERIVED FROM DIGITAL COMMUNICATIONS" and filed 8 Oct. 2015, which is a continuation of U.S. patent application Ser. No. 14/079,521, titled "SYSTEMS AND METHODS FOR ENHANCING USER DATA DERIVED FROM DIGITAL COMMUNICATIONS" and filed 13 Nov. 2013, which is a continuation of PCT Application No. PCT/US13/68354, titled "SYSTEMS AND METHODS FOR ENHANCING USER DATA DERIVED FROM DIGITAL COMMUNICATIONS" and filed 4 Nov. 2013, which claims priority to U.S. Provisional Patent Application No. 61/722,231, titled "SYSTEMS AND METHODS FOR AUTOMATED ENHANCEMENT AND APPENDING OF DATA DERIVED FROM DIGITAL COMMUNICATIONS" and filed 4 Nov. 2012, the disclosures of which are hereby incorporated, in their entirety, by these references.

BACKGROUND

Organizations providing information concerning certain issues often wish to cater their outreach efforts to focus on individuals who are most likely to share an interest in those particular issues. Time and resources for contacting and educating people concerning various issues is often limited, while the number of people to sort through can daunting. During political campaigns, for example, a great deal of money is frequently spent on advertising that is inefficiently directed to broad segments of the population. Similarly, companies marketing to consumers typically desire to present their products to individuals they foresee being interested in the products, without spending excessive amounts advertising to others who are likely to show little or no interest in the advertised products. However, while organizations in the digital age frequently collect information related to individuals, such information is often not useful in effectively targeting individuals who might be most likely to respond well to various advertising and outreach efforts.

SUMMARY

As will be described in greater detail below, the instant disclosure generally relates to systems and methods for enhancing user data derived from digital communications.

According to at least one embodiment, a computer-implemented method for enhancing user data derived from digital communications may include detecting a transaction request from a first computing device in response to an issue-specific invitation, and generating a first dataset based on the transaction request, the first dataset including an issue-specific data element corresponding to the issue-specific invitation. The method may additionally include associating the first dataset with a user of the first computing device, identifying a second dataset associated with the user, and appending the second dataset to the first dataset to generate an appended dataset.

According to some embodiments, a computer-implemented method for enhancing user data derived from digital communications may include detecting a plurality of transaction requests in response to an issue-specific invitation, generating a first plurality of datasets based on the plurality of transaction requests, each of the first plurality of datasets including an issue-specific data element corresponding to the issue-specific invitation, associating the first plurality of datasets with a plurality of computing device users, identifying a second plurality of datasets associated with the plurality of computing device users, and determining at least one correlation between the issue-specific data element and at least a portion of the second plurality of datasets.

According to various embodiments, a system for enhancing user data derived from digital communications may include a detecting module that detects a transaction request from a first computing device in response to an issue-specific invitation, a generating module that generates a first dataset based on the transaction request, the first dataset including an issue-specific data element corresponding to the issue-specific invitation, an associating module that associates the first dataset with a user of the first computing device. The system may further include an identifying module that identifies a second dataset associated with the user, an appending module that appends the second dataset to the first dataset to generate an appended dataset, and at least one processor configured to execute the receiving module, the generating module, the associating module, the identifying module, and the appending module.

According to at least one embodiment, a non-transitory computer-readable-storage medium may cause a first computing device to detect a transaction request from a second computing device in response to an issue-specific invitation, generate a first dataset based on the transaction request, the first dataset including an issue-specific data element corresponding to the issue-specific invitation, and associate the first dataset with a user of the second computing device. The non-transitory computer-readable-storage medium may cause a first computing device to identify a second dataset associated with the user, append the second dataset to the first dataset to generate an appended dataset.

These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
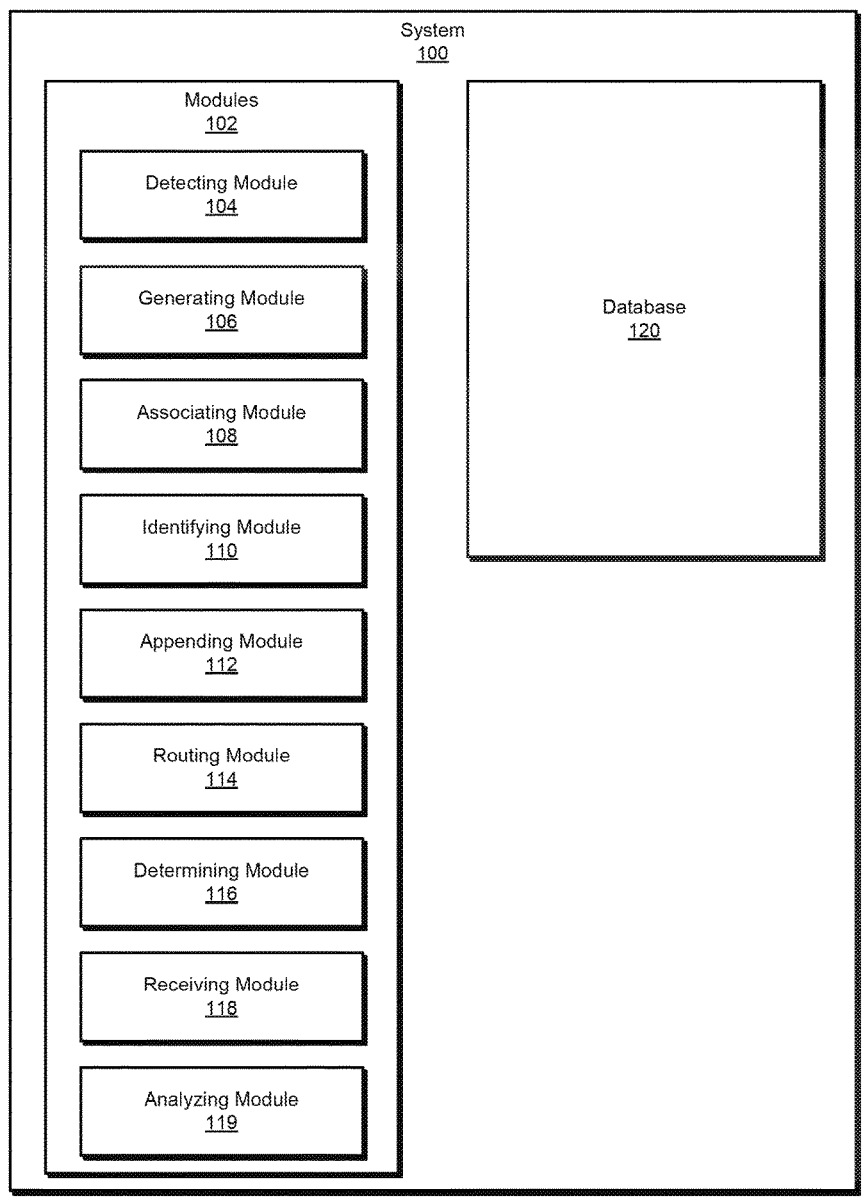
FIG. 1 is a block diagram of an exemplary system for enhancing user data derived from digital communications.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for enhancing user data derived from digital communications. Embodiments of this disclosure may enable user data derived from digital communications, such as communications that include digital transaction requests and/or message-based communications, to be appended with additional user data to generate an appended dataset associated with the user. Such appended datasets may be utilized for identifying, researching, and/or contacting prospective or current customers of commercial goods and/or services, prospective or current donors to not-for-profit organizations, social organizations, and/or political organization, and/or prospective or current consumers of issue-based information. An appended dataset may be further modified through analysis, comparison, and/or appendation with additional data associated with the user to identify additional information and attributes associated with the user.

Figure 2:
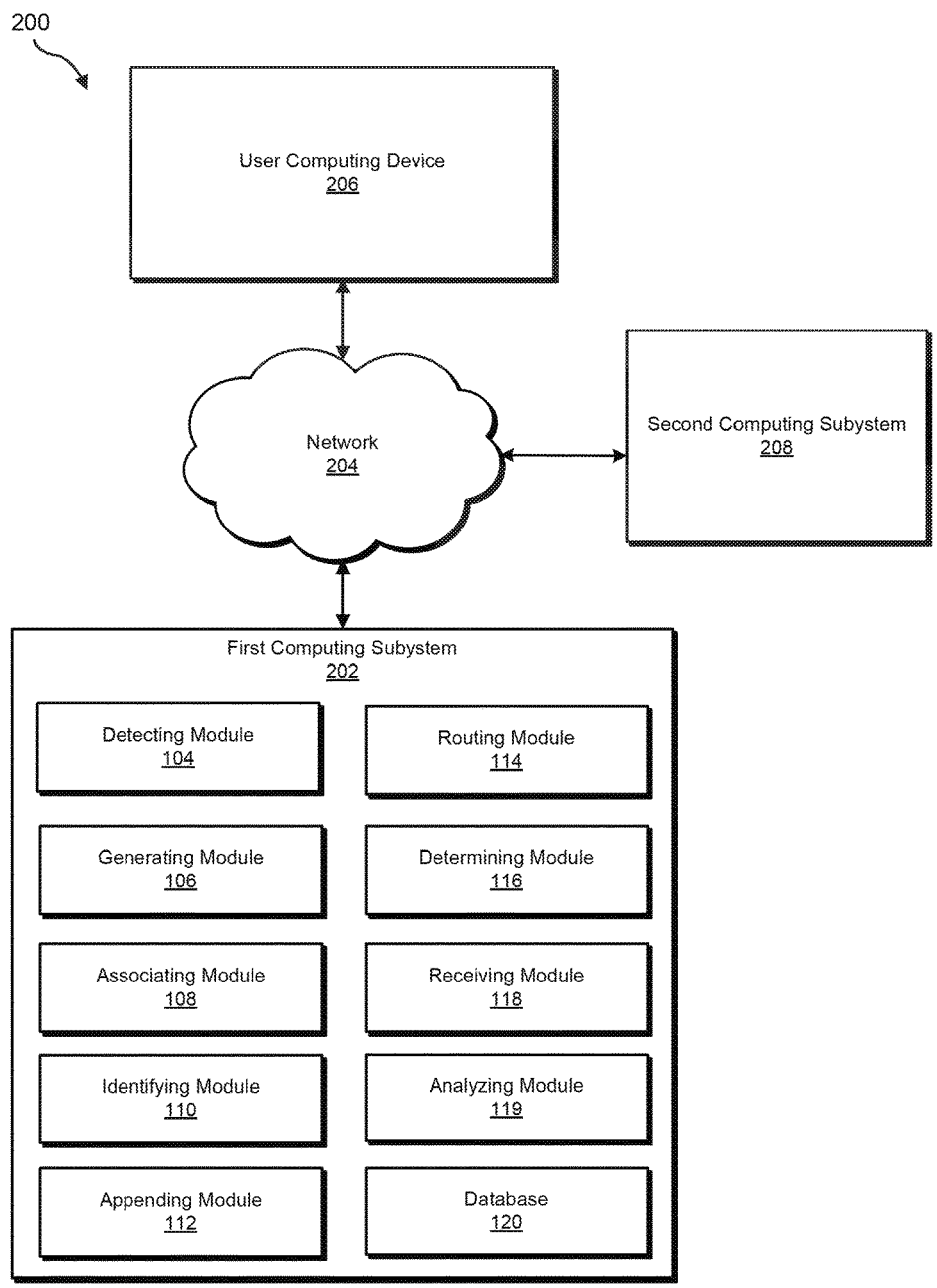
FIG. 2 is a block diagram of an exemplary system for enhancing user data derived from digital communications.

The following will provide, with reference to FIGS. 1 and 2, detailed descriptions of exemplary systems for enhancing user data derived from digital communications. Detailed descriptions of corresponding computer-implemented systems and methods will also be provided in connection with FIGS. 4-14. In addition, detailed descriptions of an exemplary computing system and network architecture capable of implementing one or more of the embodiments described herein will be provided in connection with FIGS. 15 and 16, respectively.

FIG. 1 is a block diagram of exemplary systems 100 for enhancing user data derived from digital communications. As illustrated in these figures, exemplary system 100 may include one or more modules 102 for performing one or more tasks.

For example, and as will be explained in greater detail below, exemplary system 100 may include a detecting module 104 that may detect a transaction and/or a communication request. Exemplary system 100 may additionally include a generating module 106 that may generate a first dataset based on the transaction request, the first dataset including an issue-specific data element corresponding to the issue-specific invitation. Exemplary system 100 may also include an associating module 108 that may associate the first dataset with a user of the first computing device. Exemplary system 100 may additionally include an identifying module 110 that may identify at least one dataset, such as a second dataset, a third dataset, and/or any number of datasets associated with the user. Exemplary system 100 may further include an appending module 112 that may append the second dataset, and/or any additional datasets, to the first dataset to generate an appended dataset.

According to various embodiments, exemplary system 100 may also include a routing module 114 that may route the transaction through a messaging service. Exemplary system 100 may additionally include a determining module 116 that may determine at least one correlation between the issue-specific data element and at least a portion of the second dataset. Exemplary system 100 may further include a receiving module 118 for communications from one or more devices, such as user computing device 206. Exemplary system 100 may further include analyzing module 119 for analyzing and/or modeling data. Although illustrated as separate elements, one or more of modules 102 in FIG. 1 may represent portions of a single module or application.

In certain embodiments, one or more modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., first computing subsystem 202, user computing device 206, and/or second computing subsystem 208), computing system 1510 in FIG. 15, and/or portions of exemplary network architecture 1600 in FIG. 16. One or more of modules 102 in FIG. 1 may also represent all or portions of one or more special-purpose computers configured to perform one or more tasks.

Exemplary system 100 may also include at least one database 120 for storing various data elements. Database 120 may represent portions of a single database or computing device or a plurality of databases or computing devices. For example, database 120 may represent a portion of a server, computing system 1510 in FIG. 15, and/or portions of exemplary network architecture 1600 in FIG. 16. Alternatively, database 120 may represent one or more physically separate devices capable of being accessed by a computing device, such as an external computing device or server, computing system 1510 in FIG. 15, and/or portions of exemplary network architecture 1600 in FIG. 16.

Exemplary system 100 illustrated in FIG. 1 may be implemented in a variety of ways. For example, all or a portion of exemplary system 100 may represent portions of exemplary system 200 in FIG. 2. As shown in FIG. 2, system 200 may include a first computing subsystem 202 connected to a user computing device 206 via a network 204. A second computing subsystem 208 may also be connected to first computing subsystem 202 and/or user computing device 206 via network 204. Computing subsystem 202 may be programmed with one or more of modules 102 and/or may store all or a portion of the data in database 120. Additionally or alternatively, second computing subsystem 208 may be programmed with one or more of modules 102 and/or may store all or a portion of the data in database 120.

In at least one embodiment, one or more of modules 102 from FIG. 1 may, when executed by at least one processor of first computing subsystem 202, facilitate first computing subsystem 202 in enhancing user data derived from digital communications. In one example, first computing subsystem 202 may represent at least one computing device that detects a digital communication from user computing device 206 and enhances user data derived from the digital communication. For example, and as will be described in greater detail below, one or more of modules 102 may cause first computing subsystem 202 to enhance user data derived from the digital communication with user computing device 206. In at least one embodiment, first computing subsystem 202 may detect a digital communication between user computing device 206 and second computing subsystem 208.

By way of example, and as will be described in greater detail below, detecting module 104 may be programmed to detect a transaction and/or a communication request from user computing device 206 in response to an issue-specific invitation. For example, detecting module 104 may be programmed to detect a transaction and/or communication request sent from user computing device 206 to second computing subsystem 208. Generating module 106 may be programmed to generate a first dataset based on the transaction request, the first dataset including an issue-specific data element corresponding to the issue-specific invitation. Associating module 108 may be programmed to associate the first dataset with a user of user computing device 206. Identifying module 110 may be programmed to identify a second dataset associated with the user. Appending module 112 may be programmed to append the second dataset to the first dataset to generate an appended dataset. Routing module 114 may be programmed to route the transaction through a messaging service. Determining module 116 may be programmed to determine at least one correlation between the issue-specific data element and at least a portion of the second dataset.

First computing subsystem 202 generally represents any type or form of at least one computing device capable of reading computer-executable instructions. Examples of first computing subsystem 202 include, without limitation, laptops, tablets, desktops, servers, cellular phones, PDAs, multimedia players, embedded systems, combinations of one or more of the same, exemplary computing system 1510 in FIG. 15, or any other suitable computing device. In some embodiments, first computing subsystem 202 may comprise at least a portion of a server. For example, first computing subsystem 202 may comprise a server that generally represents any type or form of computing device that is capable of enhancing user data derived from digital communications. Examples of such a server include, without limitation, application servers and database servers configured to provide various database services and/or run certain software applications.

User computing device 206 generally represents any type or form of computing device capable of reading computer-executable instructions. Examples of user computing device 206 include, without limitation, laptops, tablets, desktops, servers, cellular phones, PDAs, multimedia players, embedded systems, combinations of one or more of the same, exemplary computing system 1510 in FIG. 15, or any other suitable computing device.

Second computing subsystem 208 generally represents any type or form of at least one computing device capable of reading computer-executable instructions. Examples of first computing subsystem 208 include, without limitation, laptops, tablets, desktops, servers, cellular phones, PDAs, multimedia players, embedded systems, combinations of one or more of the same, exemplary computing system 1510 in FIG. 15, or any other suitable computing device. In some embodiments, first computing subsystem 202 may comprise at least a portion of a server. For example, first computing subsystem 202 may comprise a server that generally represents any type or form of computing device that is capable of enhancing user data derived from digital communications. Examples of such a server include, without limitation, application servers and database servers configured to provide various database services and/or run certain software applications.

Network 204 generally represents any medium or architecture capable of facilitating communication or data transfer. Examples of network 204 include, without limitation, an intranet, a WAN, a LAN, a PAN, the Internet, PLC, a cellular network (e.g., a GSM network), exemplary network architecture 1600 in FIG. 16, or the like. Network 204 may facilitate communication or data transfer using wireless or wired connections. In one embodiment, network 204 may facilitate communication between first computing subsystem 202, user computing device 206, and/or second computing subsystem 208.

Figure 3:
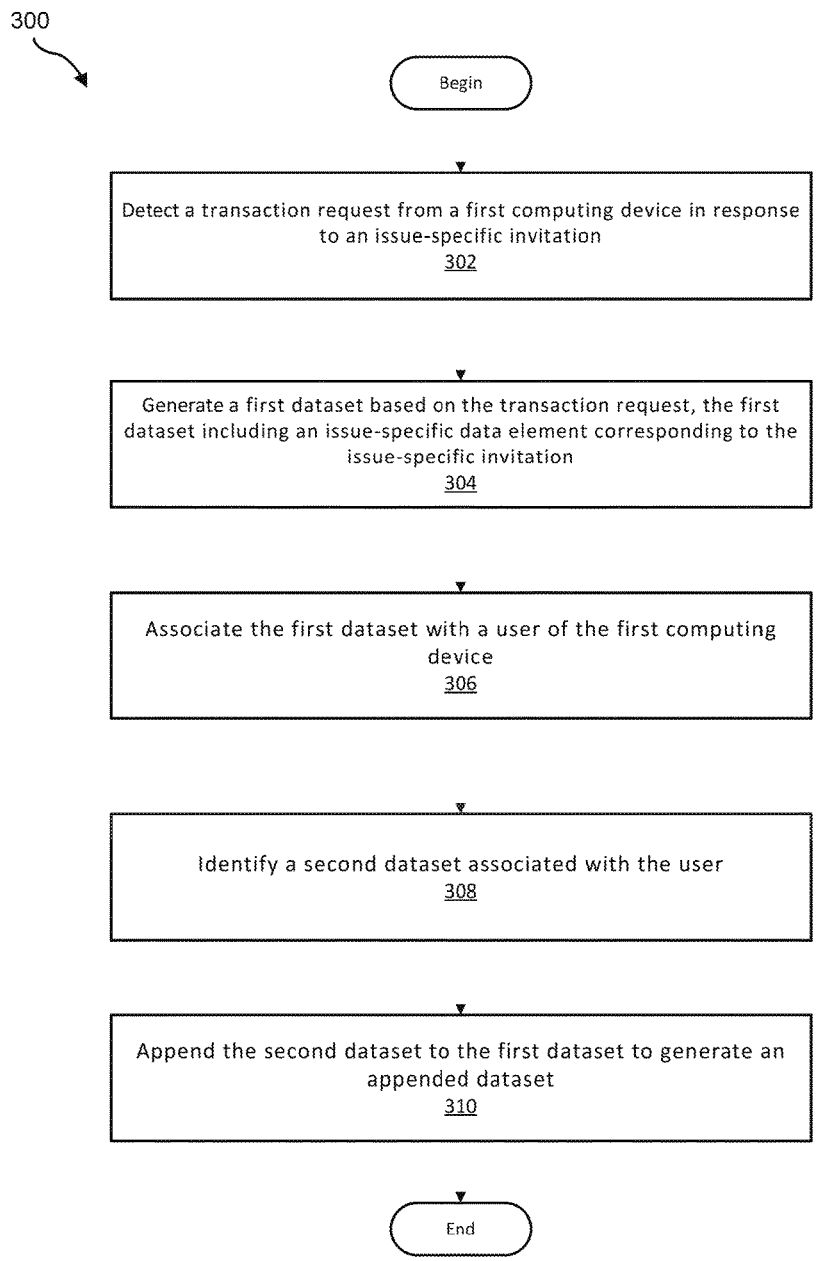
FIG. 3 is a flow diagram illustrating a process flow of an exemplary system for enhancing user data derived from digital communications.

FIG. 3 is a flow diagram of an exemplary computer-implemented method 300 for enhancing user data derived from digital communications. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 1510 in FIG. 15, and/or portions of exemplary network architecture 1600 in FIG. 16.

As illustrated in FIG. 3, at step 302 one or more of the systems described herein may detect a transaction and/or communication request from a computing device in response to an issue-specific invitation. For example, at step 302 detecting module 104 may, as part of computing device 202 in FIG. 2, detect a transaction request transmitted from user computing device 206. According to some embodiments, a plurality of transaction requests may be detected in response to the issue-specific invitation.

According to at least one embodiment, a transaction and/or a communication request may be initiated at computing device 206 by an end user. For example, a user of user computing device 206 may initiate a transaction and/or a communication via network 204. According to various embodiments, the user may utilize an interface presented by user computing device 206 to request a transfer of monetary funds via network 204. Such transaction and/or communication may be directed to first computing subsystem 202 and/or to another computing subsystem (e.g., second computing subsystem 208).

The transaction and/or communication may be initiated in response to an invitation. For example, a user of user computing device 206 may initiate the transaction and/or communication in response to an issue-specific invitation. An issue-specific invitation may include an issue-specific communication received by a user that provides the user with connection information for responding to the communication. The issue-specific communication may comprise, for example, any suitable communication, such as an advertisement, notice, and/or other suitable direct or indirect contact, related to a particular issue, cause, topic, individual, entity, and/or event, without limitation. According to at least one embodiment, a user may, for example, receive a communication (e.g., television, radio, web page, email, text, etc.) inviting the user to respond by donating money for an issue-specific cause (e.g., to support the candidacy of a political candidate). For example, the user may be invited to transfer funds to a specified telephone number via a text-to-donate transaction. The user may further be instructed to include text in a transaction and/or communication related to an issue-specific invitation that the user is responding to. For example, in responding to an issue-specific invitation, a user may include a keyword highlighted in the issue-specific invitation in the body of a text message sent by user computing device 206, thereby alerting a recipient of the text message that the user is initiating a transaction related to the issue-specific invitation.

A user may initiate any suitable type of transaction and/or communication, in response to an issue-specific invitation, without limitation. Examples of transactions that may be transmitted from user computing device 206 include, without limitation, transactions in which a user 1) transacts, commits to transact, or pledges to transact a monetary contribution to, or purchase from, a political candidate, campaign committee, or political party committee, or other duly registered political entity, their vendors, assignees, or other authorized parties, 2) transacts, or commits to transact a purchase of a commercial product or service, and/or 3) transacts, or commits to transact a pledge of support to a group, cause or political candidate.

According to some embodiments, a transaction initiated at user computing device 206 by the user may include, for example, a billing transaction, including, without limitation, a direct carrier transaction, a text-to-give transaction, a text-to-donate transaction, a text-to-purchase transaction, a text-to-contribute transaction, a text-to-sign-up transaction, a text-to-purchase transaction, a text-to-vote transaction, a text-to-be-billed transaction, a text-to-join transaction, a text-to-opt-in transaction, a text-to-respond transaction, a share-to-donate transaction, a post-to-donate transaction, a tweet-to-donate transaction, a respond-to-donate transaction, and/or any other suitable transaction. According to various embodiments, user computing device 206 may include an interface, such as an application programming interface, and/or other means of computer-executed communication for facilitating communication between various applications installed on user computing device 206, first computing subsystem 202, and/or second computing subsystem 208.

Examples of communications that may be transmitted from user computing device 206 include, without limitation, any type of text-based and/or multimedia messages, such as SMS messages, MMS messages, smart messages, or extended messages, email messages, social media messages, browser-based messages, streaming messages, website postings, and/or any other suitable types of messages.

The transaction and/or communication initiated at user computing device 206 may be transmitted over a network via any suitable type of transmission service, provider, or other means, without limitation. For example, the transaction and/or communication may be transmitted from user computing device 206 as data over network 204 via, for example, a short message service, a multimedia messaging service, a smart messaging service, an extended message service, an instant messaging service, an email service, a message transmittal application, a message response capture application, a social media and/or personal networking communication application programming interface, a share-to-donate application programming interface, a post-to-donate application programming interface, a tweet-to-donate application programming interface, a social media stream capture application, a user post application, a user response application, a user sharing application, telephony, and/or any other suitable means of data transmission.

According to some embodiments, a transaction and/or communication initiated at user computing device 206 may be directed to, and/or otherwise routed through, first computing subsystem 202. For example, user computing device 206 may request that monetary funds be sent to first computing subsystem 202. When the transaction and/or communication request is received at first computing subsystem 202, detecting module 104 may detect receipt of the transaction and/or communication request.

In additional embodiments, a transaction and/or communication initiated at user computing device 206 may be directed to, and/or otherwise routed through, second computing subsystem 208. Detecting module 104 may be configured to detect that the transaction and/or communication request has been received at first computing subsystem 202. For example, detecting module 104 located in first computing subsystem 202 may monitor second computing subsystem 208 for receipt of transaction and/or communication requests from computing devices, such as user computing device 206. In some embodiments, a notification of a transaction and/or communication request may be sent to first computing subsystem 202 by user computing device 206 and/or a transmission service provider utilized to transfer data associated with the transaction and/or communication request to second computing subsystem 208.

At step 304 one or more of the systems described herein may generate a first dataset based on the transaction request. The first dataset may include an issue-specific data element corresponding to the issue-specific invitation. For example, at step 304 generating module 106 may, as part of first computing subsystem 202 in FIG. 2, generate a first dataset associated with a user of user computing device 206 based on data received from user computing device 206 in conjunction with the transaction and/or communication request. For example, a service provider involved in transmission of the transaction and/or communication request may also transmit data that includes user identifiers and/or user profile characteristics associated with the user. According to at least one embodiment, a first plurality of datasets may be generated based on the plurality of transaction requests, each of the first plurality of datasets including an issue-specific data element corresponding to the issue-specific invitation.

In some examples, the transaction and/or communication request may additionally include an indication that the transaction and/or communication request was initiated by a user of user computing device 206 in response to an issue-specific invitation. According to at least one embodiment, a user may, for example, receive a communication (e.g., television, radio, web page, email, text, etc.) inviting the user to respond by donating money for an issue-specific cause (e.g., to support the candidacy of a political candidate). For example, the user may be invited to transfer funds to a specified telephone number via a text-to-donate transaction. The user may further be instructed to include text in a transaction and/or communication related to an issue-specific invitation that the user is responding to. For example, in responding to an issue-specific invitation, a user may include a keyword highlighted in the issue-specific invitation in the body of a text message sent by user computing device 206, thereby providing notification to a recipient of the text message that the user is initiating a transaction related to the issue-specific invitation.

According to at least one embodiment, generating module 106 may generate the first dataset by receiving, aggregating, organizing, and/or formatting data associated with the user of user computing device 206. The user data in the first dataset generated by generating module 106 may include data generated based on the user's response to the issue-specific invitation. For example, the first dataset may include an issue-specific data element directly corresponding to the issue-specific invitation. By way of example, a user of user computing device 206 may receive a communication (e.g., television, radio, web page, email, text, print, mail advertisement, etc.) inviting the user to respond by donating money for an issue-specific cause (e.g., to support the candidacy of a political candidate). For example, the user may be invited to transfer funds to a recipient via a specified telephone number by means of a text-to-donate transaction. The user may further be instructed to include specific text in a transaction and/or communication related to the issue-specific invitation that the user is responding to. For example, in responding to an issue-specific invitation, a user may include a specified keyword within the body of a text message sent by user computing device 206, thereby alerting a recipient of the text message that the user is initiating a transaction related to the issue-specific invitation.

At step 306 one or more of the systems described herein may associate the first dataset with a user of the first computing device. For example, at step 306 associating module 108 may, as part of first computing subsystem 202 in FIG. 2, associate the first dataset with a user of user computing device 206 based on data received from user computing device 206 in conjunction with the transaction and/or communication request. While the first dataset may be associated with the user's legal name, the first dataset may additionally or alternatively be associated with any other suitable user identifier, such as, without limitation, a phone number, IP address, membership number, account number, and/or an on-line pseudonym associated with the user, including, for example, a username, login name, screen name, nickname, and/or handle. In some embodiments, a first plurality of datasets may be associated with a plurality of computing device users.

Associating the first dataset with the user of user computing device 206 may enable the first dataset to be used as appending data to be appended to other data associated with the user and/or as a dataset that is enhanced by the addition of appending data from one or more other sources. Data included in the first dataset may be useful alone and/or in conjunction with additional data for purposes of researching and/or contacting prospective or current customers of commercial goods and/or services, prospective or current donors to not-for-profit organizations, social organizations, and/or political organizations, and/or prospective or current consumers of issue-based information. In some embodiments, the first dataset may be modified through analysis, comparison, and appendation with additional data associated with the user to identify additional information and characteristics associated with the user.

At step 308 one or more of the systems described herein may identify a second dataset associated with the user. For example, at step 308 identifying module 110 may, as part of first computing subsystem 202 in FIG. 2, identify a second dataset associated with the user of user computing device 206. The second dataset associated with the user may be obtained through any suitable source. For example, data in the second dataset may be obtained by searching one or more databases for data associated with one or more identifiers associated with the user. For example, various public and/or private databases, such as databases accessible via network 204 and/or internally within first computing subsystem 202 and/or second computing subsystem 208, may be searched for data associated the user's name. According to some embodiments, a second plurality of datasets associated with a plurality of computing device users may be identified.

In some examples, public and/or private databases may be searched for data associated with any suitable user identifier, such as, without limitation, a phone number, IP address, membership number, account number, and/or an on-line pseudonym associated with the user, including, for example, a username, login name, screen name, nickname, and/or handle. According to at least one embodiment, data identified by identifying module 110 may be filtered based on characteristics of the data and/or based on the source of the data. In some embodiments, similar and/or duplicative data from one or more sources may be merged into the second dataset and/or filtered out so as to not be redundantly included in the second dataset.

At step 310 one or more of the systems described herein may append the second dataset to the first dataset to generate an appended dataset. For example, appending module 112 may append the second dataset to the first dataset to generate an appended dataset associated with the user of user computing device 206. The appended dataset may be utilized by first computing subsystem 202 and/or second computing subsystem 208 and/or may be transferred to another computing system. In some embodiments, at least one correlation between an issue-specific data element and at least a portion of a second plurality of datasets may be determined.

According to various embodiments, the appended dataset may be used for purposes of researching or contacting prospective or current consumers of commercial goods and/or services, researching or contacting prospective or current users of free or "freemium" products, and/or researching or contacting prospective and current donors to not-for-profit organizations, social organizations. The appended dataset may be used for researching or contacting prospective consumers of political information for purposes of effecting the outcome of an election, the passage of legislation, or other means of effecting the make-up of a political body, and/or outcome of an event by which statutes can be enacted, legislation proposed, and/or government resources allocated.

According to some embodiments, the appended dataset may be useful for targeting, voter registration and turnout records, non-profit donation, political contribution and consumer data records, polls, surveys, commercially available personal data and all other means of obtaining data relevant to 1) targeting prospective consumers of political information for fundraising, persuasion, engagement, communication, and voter turnout, 2) promoting a product or service, and/or 3) recruiting supporters for various non-profit or social welfare causes.

In some embodiments, as will be described in further detail below, the appended dataset may subsequently be manipulated through electronic means, including but not limited to online, web based interfaces accessed via computer and/or any other mechanical or electrical device or information storage and retrieval system, software that can be installed on any computer or any other mechanical or electrical device or information storage and retrieval system, and/or a computing device or any other mechanical or electrical device, or information storage and retrieval system, manufactured for the storage, retrieval, and manipulation of data, including, but not limited to computer hardware, software, handheld or portable computing devices, which employ binary, nonbinary, quantum, or extra or interdimensional means of data or information transmittal.

According to various embodiments, obtaining and utilizing appending and/or appended data may include, without limitation, 1) obtaining transmitted data transmitted by one or more means as outlined above, 2) matching, appending, merging, enhancing, and/or otherwise augmenting, the obtained data with existing data records, 3) formatting, sorting, filtering, or otherwise manipulating the data, and 4) delivering the appended data to other end users.

Obtaining the data may include obtaining data originating as an SMS, MMS, or other messaging or digital transaction means, from a computing, communication, or other information storage and retrieval system or device, based on an act of a device owner, subscriber, or authorized user engaging in a transaction as outlined above, to including, but not limited to, telephone numbers, IP addresses, unique device IDs, other "digital signatures," or unique identifying characteristics obtained through the transmittal of data or information.

Matching, appending, merging, enhancing, and/or otherwise augmenting the appending data may be accomplished using, for example, an automated data or information computation, storage, or retrieval system. The appending data may be matched, appended, merged, enhanced, and/or otherwise augmented with any record or information germane to the targeting, and/or sorting the information of current or prospective, consumers, users, customers, supporters, or consumers of political information for fundraising, persuasion, engagement, communication, dissemination of information, and/or voter turnout information. Such records and/or information may include any suitable information, including, without limitation, the name of an owner, subscriber, or authorized user, an address, additional contact information, voter registration records, voter participation records, non-profit donation records, political contribution records, demographic data, consumer data, online behavioral data, online profile and personal data, survey responses, and/or any other data germane to targeting prospective consumers of political information for fundraising, persuasion, engagement, communication, and/or voter turnout.

Data utilized herein may be derived from the transmittal of data via any of the means described herein, and/or via, for example, an automated telephonic application, such as a robocall application, a predictive dialing application, and/or an Interactive Voice Response ("IVR") application, any suitable application that monitors, captures, and/or extracts transactions, communications, posts, and/or any other activity related to social media sites, accounts, and/or pages, without limitation, and/or via online tracking software and/or browser based analytic software.

In some examples, the appending data may subsequently be formatted, sorted, filtered, or otherwise manipulated by means of electronic, mechanical, or other means for purposes of identifying or grouping, prospective consumers of retail products and/or services, and/or consumers of political or other issue-based information for fundraising, persuasion, engagement, communication, dissemination of information, and/or voter turnout for the purposes as outlined above The appending and/or appended data may subsequently be delivered to organizations and individuals seeking to use it for the purposes outlined above. Such data may be delivered via an information storage and retrieval system that can be accessed by, or downloaded onto, desktop, laptop, and mobile computing, and/or communications platforms, accessed by software application, or any other information storage or retrieval systems.

Figure 4:
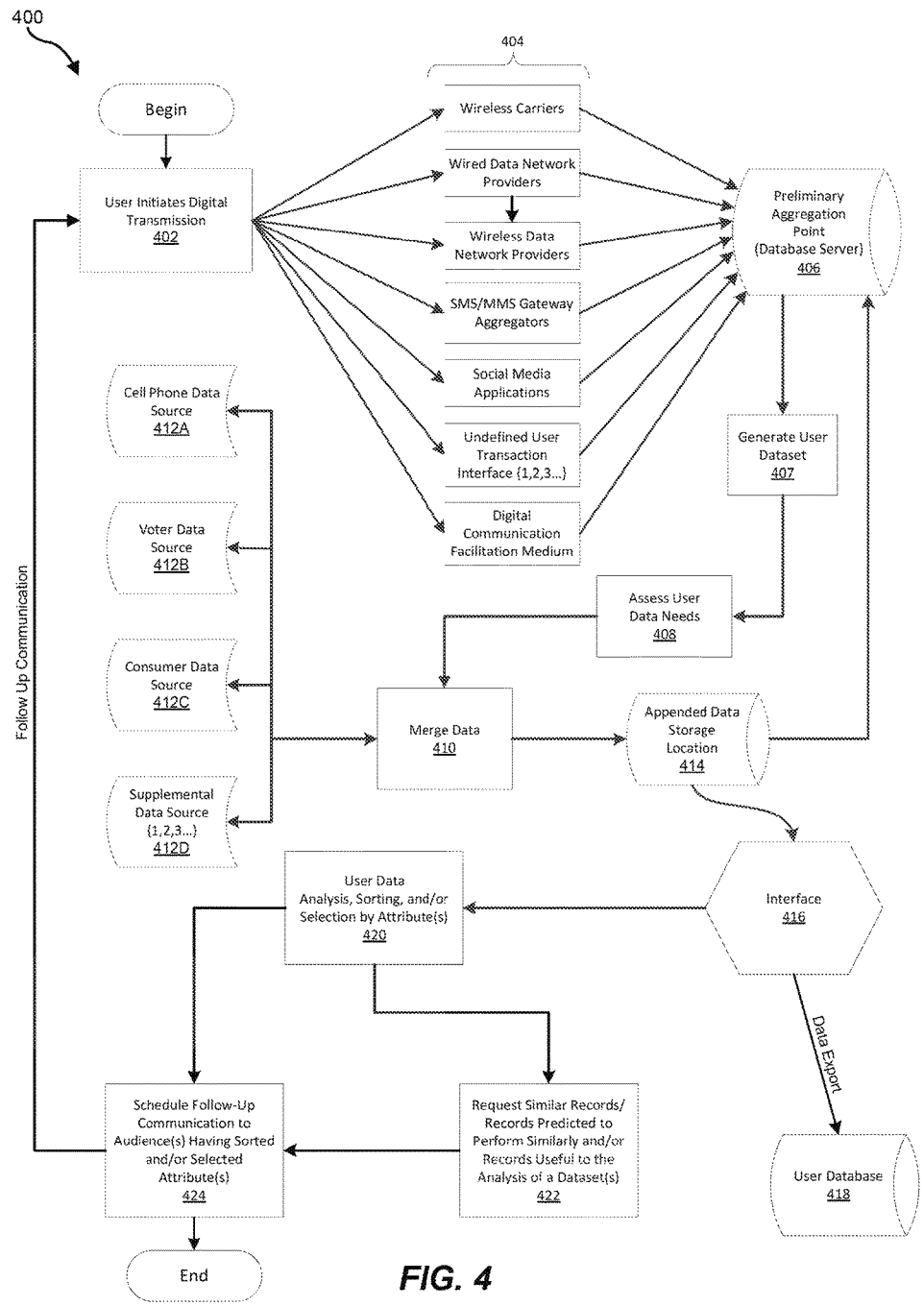
FIG. 4 is a flow diagram illustrating a process flow of an exemplary system for enhancing user data derived from digital communications.
Figure 5:
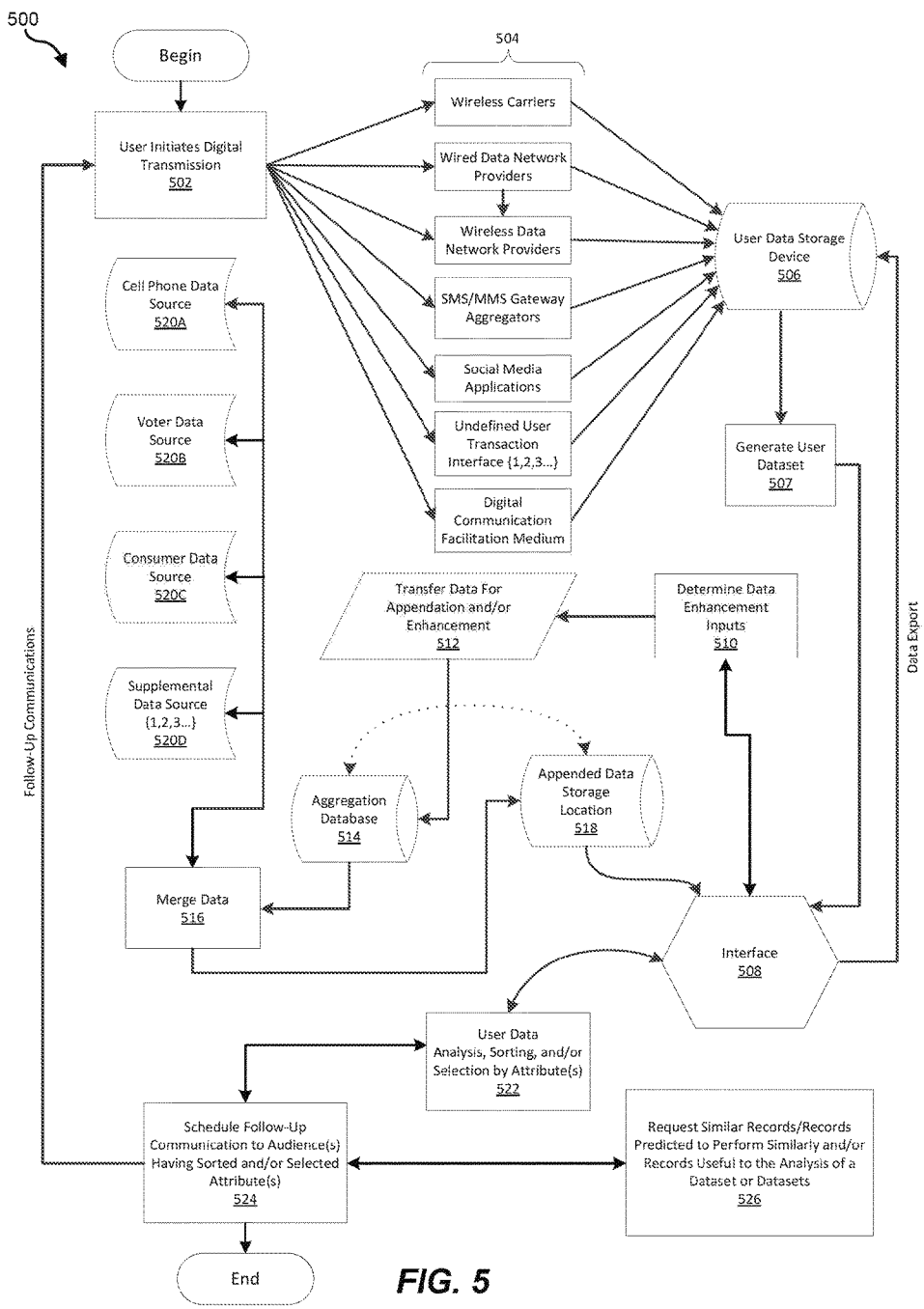
FIG. 5 is a flow diagram illustrating a process flow of an exemplary system for enhancing user data derived from digital communications.
Figure 6:
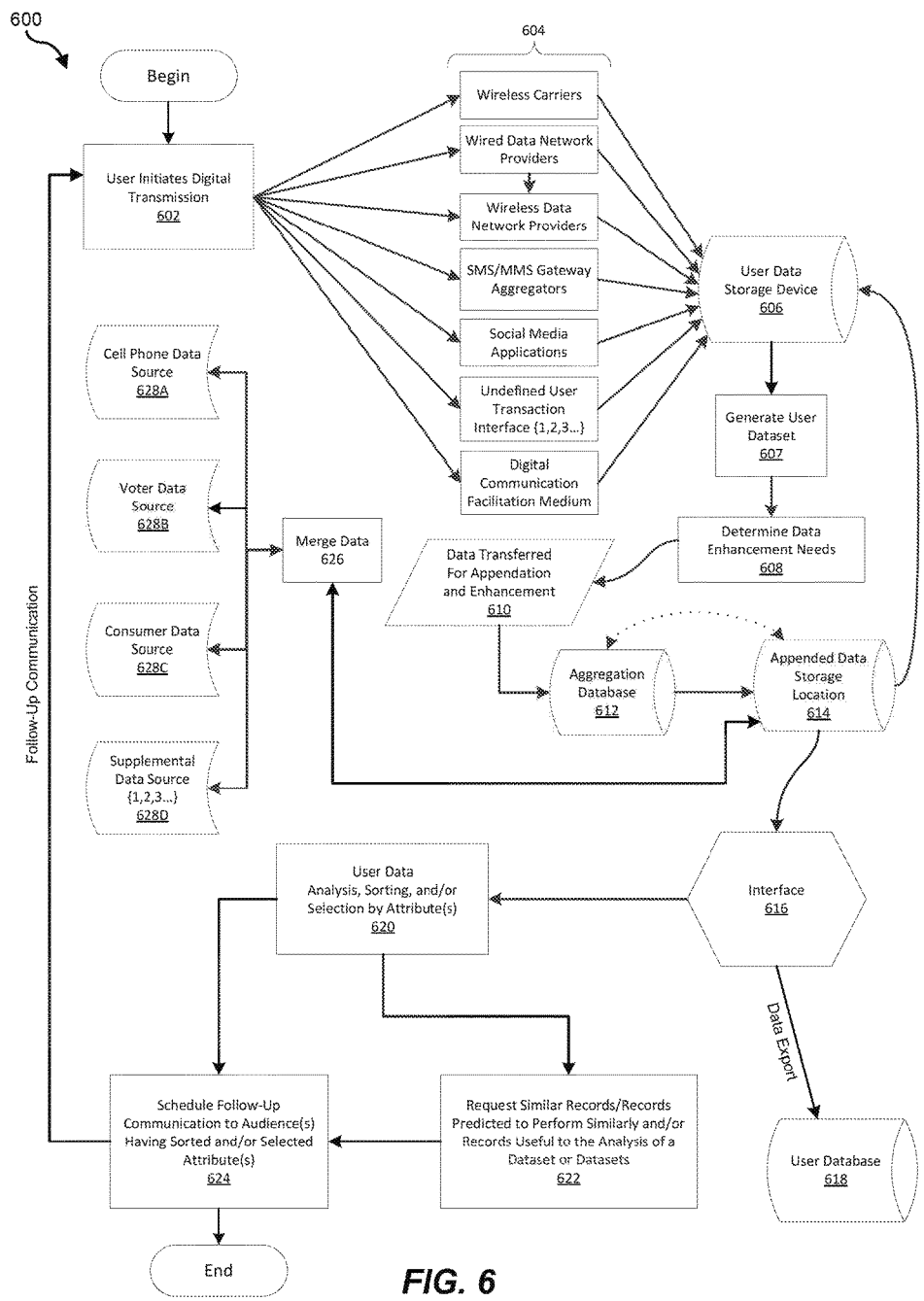
FIG. 6 is a flow diagram illustrating a process flow of an exemplary system for enhancing user data derived from digital communications.

FIGS. 4-6 are flow diagrams illustrating process flows of exemplary systems 400, 500, and 600 for enhancing user data derived from digital communications. The steps shown in FIGS. 4-6 may be performed by any suitable computer-executable code and/or computing system. In some embodiments, the steps shown in FIGS. 4-6 may be performed by one or more of the components of systems 100 and/or 200 illustrated in FIGS. 1 and 2, computing system 1510 in FIG. 115, and/or portions of exemplary network architecture 1600 in FIG. 16.

As illustrated in FIG. 4, at block 402, a user may initiate a transaction and/or a communication. For example, a user of user computing device 206 may initiate a transaction and/or a communication via network 204. According to various embodiments, the user may utilize an interface, such as a graphical user interface (GUI), presented by user computing device 206 to request a transfer of monetary funds via network 204. Such transaction and/or communication may be directed to first computing subsystem 202 and/or to another computing subsystem (e.g., second computing subsystem 208).

The transaction and/or communication may be initiated in response to an invitation. For example, a user of user computing device 206 may initiate the transaction and/or communication in response to an issue-specific invitation. An issue-specific invitation may include an issue-specific communication received by a user that provides the user with connection information for responding to the communication. The issue-specific communication may comprise, for example, any suitable communication, such as an advertisement, notice, and/or other suitable direct or indirect contact, related to a particular issue, cause, topic, individual, entity, and/or event, without limitation. According to at least one embodiment, a user may, for example, receive a communication (e.g., television, radio, web page, email, text, etc.) inviting the user to respond by donating money for an issue-specific cause (e.g., to support the candidacy of a political candidate). For example, the user may be invited to transfer funds to a specified telephone number via a text-to-donate transaction. The user may further be instructed to include text in a transaction and/or communication related to an issue-specific invitation that the user is responding to. For example, in responding to an issue-specific invitation, a user may include a keyword highlighted in the issue-specific invitation within the body of a text message sent by user computing device 206, thereby alerting a recipient of the text message that the user is initiating a transaction related to the issue-specific invitation.

The user may initiate any suitable type of transaction and/or communication, without limitation. According to some embodiments, a transaction initiated by the user may include, for example, a transaction, including, without limitation, a direct carrier billing transaction, a text-to-give transaction, a text-to-donate transaction, a text-to-purchase transaction, a text-to-contribute transaction, a text-to-sign-up transaction, a text-to-purchase transaction, a text-to-vote transaction, a text-to-be-billed transaction, a text-to-join transaction, a text-to-opt-in transaction, a text-to-respond transaction, a share-to-donate transaction, a post-to-donate transaction, a tweet-to-donate transaction, a respond-to-donate transaction, and/or any other suitable transaction. According to various embodiments, a user computing device, such as user computing device 206, that transmits the transaction and/or communication may also include an application programming interface for facilitating communication between various applications installed on the computing device.

The transaction and/or communication initiated by the user may be transmitted over a network via any suitable type of transmission service or means, without limitation. For example, the transaction and/or communication may be initiated by the user and transmitted from user computing device 206 as data via, for example, a short message service, a multimedia messaging service, a smart messaging service, an extended message service, an instant messaging service, an email service, a message transmittal application, a message response capture application, a social media application programming interface, a share-to-donate application programming interface, a post-to-donate application programming interface, a tweet-to-donate application programming interface, a social media stream capture application, a user post application, a user response application, a user sharing application, and/or any other suitable telephony based means of data transmission.

Blocks 404 illustrate exemplary paths for transmitting the transaction and/or communication initiated in block 402. For example, the user-initiated transaction and/or communication may be transmitted from computing device 206 to another computing device (e.g., computing subsystem 202 and/or second computing subsystem 208) by at least one of a wireless carrier, a wired data network provider, a wireless data network provider, an SMS/MMS gateway aggregator, a social media application, an undefined user transaction interface, a digital communication facilitation medium, and/or any other suitable data transmission service or provider. Routing of the transaction and/or communication through one of the illustrated paths (block 404) may be conducted, for example, by routing module 114 of first computing subsystem 202.

According to some embodiments, user transaction and/or communication data may also be transmitted from user computing device 206 via, for example, a physiologically integrated data transmittal device, application, and/or application programming interface integrated into one's person, and/or via a system for data transmittal that is worn, integrated into a textile, and/or otherwise worn or transported on one's person. In additional embodiments, user transaction and/or communication data may be transmitted from user computing device 206 via, by way of example, an operation within an application, a touchless data transmittal device, a wired or wireless home or office appliance, a wired or wireless home network, a wired or wireless vehicle network, a social media message, a social media application programming interface, and/or any other suitable form by which an individual can, through a digital or analog cellular data network and/or the transmittal of data or information by binary, nonbinary, quantum, or extra dimensional and/or or other means, transmit data or communications, without limitation.

User transaction and/or communication data transmitted via one or more of blocks 404 may be received at a preliminary aggregation point 406. Preliminary aggregation point 406 may comprise, for example, a database configured to receive at least a portion of the user transaction and/or communication data. In some embodiments, preliminary aggregation point 406 may, for example, comprise a database (e.g., database 120) located on first computing subsystem 202, second computing subsystem 208, and/or any computing subsystem connected to network 204. As will be described in further detail below, preliminary aggregation point 406 may also receive data from additional sources; such data may be aggregated with the user transaction and/or communication data received from, for example, user computing device 206.

At block 407, a user dataset (e.g., a first dataset) may be generated by, for example, generating module 106 of first computing subsystem 202. In at least one embodiment, detecting module 104 may detect that a first transaction and/or communication request was made by user computing device 206. For example detecting module 104 may detect that user computing device 206 initiated a first transaction and/or communication (block 402), that a data transmission service has transmitted transaction and/or communication data (block 404), and/or that transaction and/or communication data has been received by a computing subsystem (e.g., preliminary aggregation point 406).

The transmitted transaction and/or communication data may be used to generate a dataset associated with the user, such as a first dataset, based on the transaction and/or communication request. The transmitted transaction and/or communication data may, for example, provide information related to a user associated with a user computing device 206 from which the transaction and/or communication data was sent. In some embodiments, the transmitted transaction and/or communication data may include identifiers and/or characteristics associated with the user.

At block 408, user data needs may be assessed by, for example, analyzing module 119 of first computing subsystem 202. Such assessment may include assessing what data is or is not included in the first dataset generated at block 407 from the data received and/or stored at preliminary aggregation point 406. The assessment may provide an indication of data types included and/or not included in the first dataset. The assessment of the user data needs may indicate what types of data are desirable for appending to the first dataset. The assessment may also indicate which sources to request additional information from, based on desirable data determined to not be included in the first dataset.

Additionally, the assessment may provide information useful for determining whether or not to append data to the first dataset. For example, if the user data in the first dataset does not include certain threshold user characteristics specified in advance, the assessment 408 may result in a determination that the first dataset will not be appended with additional data and/or that the first dataset will not be further processed or utilized. For example, system 400 may continue processing the first dataset if, at block 408, the user data in the first dataset indicates that the user is interested in a particular issue, such as a political issue; on the contrary, system 400 may discontinue processing the first dataset if the user is determined to not be interested in the political issue.

At block 410, the dataset may be merged with additional data. For example, based on the assessment of user data needs in block 408, identifying module 110 of first computing subsystem 202 may identify one or more data sources to query for additional data related to the user and/or the first dataset. In some embodiments, the same databases may be queried in all cases to identify information related to various users and/or various datasets. In some examples, only specific types of information related to the user and/or the first dataset may be requested from the databases.

Data sources 412A-412D illustrated in FIG. 4 represent various data sources that store various types of user data, and from which additional data may be requested. One or more of data sources 412A-412D may be located in first computing subsystem 202 and/or second computing subsystem 208 of system 200. Additionally or alternatively, one or more of data sources 412A-412D may be external to first computing subsystem 202 and/or second computing subsystem 208 of system 200. For example, at least one of data sources 412A-412D may be located on one or more servers connected to network 204. As shown in FIG. 4, data associated with the user and/or the first dataset may, for example, be requested and/or retrieved from cell phone data source 412A, voter data source 412B, consumer data source 412C, one or more supplemental data source(s) 412D, and/or from any other suitable data source, without limitation.

According to at least one embodiment, data received from one or more of data sources 412A-412D may be identified by identifying module 110. For example, a second dataset including data related to consumer preferences of the user may be received and identified by identifying module 110 of first computing subsystem 202. At block 410, the second data set may be appended to the first dataset by appending module 112 so as to generate an appended dataset associated with the user. In some embodiments, additional datasets may be received from at least one data source 412A-412D; such additional datasets may be appended to the first dataset and/or the second dataset to form the appended dataset at block 410.

According to various embodiments, the appended dataset formed at block 410 may be transferred to and/or stored in a storage location 414 (e.g., database 120). In some examples, appended data may be transferred from storage location 414 back to preliminary aggregation point 406 where data from the user-initiated transaction may be received, aggregated, and/or stored. Such data may be combined with data subsequently received at preliminary aggregation point 406. For example, the appended data transferred to preliminary aggregation point 406 may be aggregated with additional data subsequently received from the user; such aggregated data may be combined with the subsequently received user data to generate a subsequent user dataset at block 407, thus reducing an amount of data that may need to be appended to the subsequent user dataset at block 410.

The appended data in storage location 414 may also be accessed via an interface 416. Interface 416 may include any suitable interface for interacting with a device storing the appended data. For example, interface 416 may include an application programming interface (API), an application binary interface, and/or any other suitable type of interface may be utilized by a computing device to retrieve the appended data from storage location 414. Interface 416 may be utilized by at least one of first computing subsystem 202 and/or second computing subsystem 208 to retrieve the appended data. Alternatively, one or more computing devices external to system 200 may obtain access to the appended data via interface 416, which may, according to some embodiments, comprise a proprietary interface.

According to at least one example, the appended dataset may be transmitted to another storage location, such as a database (e.g., database 120) located on first computing subsystem 202 and/or second computing subsystem 208. In some embodiments, as illustrated in FIG. 4, the appended dataset may be exported via interface 416 or any other suitable transmission route, to another storage location, such as a user database 418 for storing various user data, located on one or more computing devices and/or servers located external to first computing subsystem 202 and/or second computing subsystem 208.

In various embodiments, the appended dataset may be accessed via interface 416 for any suitable purpose, without limitation. For example, as illustrated at block 420 of FIG. 4, and as will be described in greater detail below, the appended dataset may be accessed via interface 416 for purposes of one or more activities, including, without limitation, formatting, analyzing, sorting, filtering, selecting, and/or otherwise manipulating at least a portion of the appended data based on one or more attributes of the appended dataset.

According to some embodiments, at block 422 of FIG. 4, records similar and/or otherwise related to those identified by the analysis, sorting, selection by attributes, and/or other procedures carried out at block 420 may be requested from at least one computing device and/or system. Additionally, records predicted to perform similarly to those identified at block 420, and/or records useful to certain analyses of at least a portion of the appended dataset, may be requested at block 422. Such records may be useful for further analysis and/or processing of the appended dataset, and/or for identification, analysis, and/or modification of various user attributes.

At block 424, one or more follow-up communications to audiences having sorted and/or selected attributes may be scheduled. For example, the analysis, sorting, selection by attributes, and/or other procedures carried out at block 420 may, provide information useful for identifying potential users that may be interested in, for example, a particular product or political issue. Additionally, in at least one embodiment, at least one follow-up communication with the user associated with the appended user set may be scheduled.

As illustrated in FIG. 5, at block 502, a user may initiate a transaction and/or a communication. For example, a user of user computing device 206 may initiate a transaction and/or a communication via network 204. The transaction and/or communication may be initiated in response to an invitation. For example, a user of user computing device 206 may initiate the transaction and/or communication in response to an issue-specific invitation.

The transaction and/or communication initiated by the user may be transmitted over a network via any suitable type of transmission service or means, without limitation. Blocks 504 illustrate exemplary paths for transmitting the transaction and/or communication initiated in block 502. For example, the user-initiated transaction and/or communication may be transmitted from computing device 206 to another computing device (e.g., computing subsystem 202 and/or second computing subsystem 208) by at least one of a wireless carrier, a wired data network provider, a wireless data network provider, an SMS/MMS gateway aggregator, a social media application, an undefined user transaction interface, a digital communication facilitation medium, and/or any other suitable data transmission service or provider.

User transaction and/or communication data transmitted via one or more of blocks 504 may be received by a user data storage device 506 comprising, for example, a database configured to receive at least a portion of the user transaction and/or communication data.

At block 507, a user dataset (e.g., a first dataset) may be generated by, for example, generating module 106 of first computing subsystem 202. The transmitted transaction and/or communication data may be used to generate a dataset associated with the user, such as a first dataset, based on the transaction and/or communication request. The first dataset generated at block 507 may be accessed via an interface 508. Interface 508 may include any suitable interface, such as an application programming interface (API), an application binary interface, and/or any other suitable type of interface utilized by a computing device to retrieve the first dataset. Interface 508 may be utilized by at least one of first computing subsystem 202 and/or second computing subsystem 208 to retrieve the appended data. Alternatively, one or more computing devices external to system 200 may obtain access to the appended data via interface 508, which may, according to some embodiments, comprise a proprietary interface.

At block 510, the first dataset may be obtained via interface 508, and data enhancement needs and/or inputs may be determined by, for example, analysis module 119 of first computing subsystem 202. Such determination may include assessing what data is or is not included in the first dataset generated at block 507. The assessment may provide an indication of data types included and/or not included in the first dataset. The assessment of the user data needs may indicate what types of data are desirable for appending to the first dataset. The assessment may also indicate which sources to request additional information from, based on desirable data determined to not be included in the first dataset. Additionally, the determination (block 510) may provide information useful for determining whether or not to append data to and/or otherwise enhance the first dataset.

At block 512 at least a portion of the first dataset that is to be appended with additional data and/or otherwise enhanced may be transferred to an aggregation database 514, as illustrated in FIG. 5. Aggregation database 514 may comprise, for example, a database (e.g., database 120) located on first computing subsystem 202, second computing subsystem 208, and/or any computing subsystem connected to network 204. As will be described in further detail below, aggregation database 514 may also receive data from additional sources; such data may be aggregated with the first dataset received from, for example, user computing device 206.

At block 516, the dataset may be merged with additional data. For example, based on the data enhancement needs and/or inputs determined in block 510, identifying module 110 of first computing subsystem 202 may identify one or more data sources to query for additional data related to the user and/or the first dataset.

Data sources 520A-520D illustrated in FIG. 5 represent various data sources that store various types of user data, and from which additional data may be requested. One or more of data sources 520A-520D may be located in first computing subsystem 202 and/or second computing subsystem 208 of system 200. Additionally or alternatively, one or more of data sources 520A-520D may be external to first computing subsystem 202 and/or second computing subsystem 208 of system 200. For example, at least one of data sources 520A-520D may be located on one or more servers connected to network 204. As shown in FIG. 5, data associated with the user and/or the first dataset may, for example, be requested and/or retrieved from cell phone data source 520A, voter data source 520B, consumer data source 520C, one or more supplemental data source(s) 520D, and/or from any other suitable data source, without limitation.

According to at least one embodiment, data received from one or more of data sources 520A-520D may be identified by identifying module 110. For example, a second dataset including data related to consumer preferences of the user may be received and identified by identifying module 110 of first computing subsystem 202. At block 516, the second data set may be appended to the first dataset by appending module 112 so as to generate an appended dataset associated with the user. In some embodiments, additional datasets may be received from at least one data source 520A-520D; such additional datasets may be appended to the first dataset and/or the second dataset to form the appended dataset at block 516.

According to various embodiments, the appended dataset formed at block 516 may be transferred to and/or stored in a storage location 518 (e.g., database 120), which is accessible via interface 508. In some examples, as illustrated in FIG. 5, storage location 518 may be in periodic or continuous communication with aggregation database 514. In some examples, at least a portion of the appended dataset may be transferred from storage location 518 back to aggregation database 514. Such data may be combined with data subsequently received at aggregation database 514. Additionally, according to at least one example, the appended dataset may be transmitted to another storage location, such as a database (e.g., database 120) located on first computing subsystem 202 and/or second computing subsystem 208.

In various embodiments, the appended dataset stored at storage location 518 may be accessed via interface 508 for any suitable purpose, without limitation. For example, as illustrated at block 522 of FIG. 5, the appended dataset may be accessed via interface 508 for purposes of one or more activities, including, without limitation, formatting, analyzing, sorting, filtering, selecting, and/or otherwise manipulating at least a portion of the appended data based on one or more attributes of the appended dataset.

At block 524, one or more follow-up communications to audiences having sorted and/or selected attributes may be scheduled. For example, the analysis, sorting, selection by attributes, and/or other procedures carried out at block 522 may provide information useful for identifying potential users that may be interested in, for example, a particular product or issue, such as a political issue. Additionally, in at least one embodiment, at least one follow-up communication with the user associated with the appended user set may be scheduled.

According to some embodiments, at block 526 of FIG. 5, records similar and/or otherwise related to those identified by the analysis, sorting, selection by attributes, and/or other procedures carried out at block 522 may be requested from at least one computing device and/or system. Additionally, records predicted to perform similarly to those identified at block 522, and/or records useful to certain analyses of at least a portion of the appended dataset, may be requested at block 526. Such records may be useful for further analysis and processing of the appended dataset and/or for identification, analysis, and/or modification of various user characteristics.

As illustrated in FIG. 6, at block 602, a user may initiate a transaction and/or a communication. For example, a user of user computing device 206 may initiate a transaction and/or a communication via network 204. The transaction and/or communication may be initiated in response to an invitation. For example, a user of user computing device 206 may initiate the transaction and/or communication in response to an issue-specific invitation.

The transaction and/or communication initiated by the user may be transmitted over a network via any suitable type of transmission service or means, without limitation. Blocks 604 illustrate exemplary paths for transmitting the transaction and/or communication initiated in block 602. For example, the user-initiated transaction and/or communication may be transmitted from computing device 206 to another computing device (e.g., computing subsystem 202 and/or second computing subsystem 208) by at least one of a wireless carrier, a wired data network provider, a wireless data network provider, an SMS/MMS gateway aggregator, a social media application, an undefined user transaction interface, a digital communication facilitation medium, and/or any other suitable data transmission service or provider.

User transaction and/or communication data transmitted via one or more of blocks 604 may be received by a user data storage device 606 comprising, for example, a database configured to receive at least a portion of the user transaction and/or communication data.

At block 607, a user dataset (e.g., a first dataset) may be generated by, for example, generating module 106 of first computing subsystem 202. The transmitted transaction and/or communication data may be used to generate a dataset associated with the user, such as a first dataset, based on the transaction and/or communication request. At block 608, data enhancement needs and/or inputs may be determined by, for example, analysis module 119 of first computing subsystem 202. Such determination may include assessing what data is or is not included in the first dataset generated at block 607.

At block 610 at least a portion of the first dataset that is to be appended with additional data and/or otherwise enhanced may be transferred to an aggregation database 612, as illustrated in FIG. 6. Aggregation database 612 may comprise, for example, a database (e.g., database 120) located on first computing subsystem 202, second computing subsystem 208, and/or any computing subsystem connected to network 204. As will be described in further detail below, aggregation database 612 may also receive data from additional sources; such data may be aggregated with the first dataset received from, for example, user computing device 206. Aggregation database 612 may be in periodic or continuous communication with a storage location 614, which stores appended data. Additionally, storage location 614 may receive an appended dataset from data merged at block 626. For example, based on the data enhancement needs and/or inputs determined in block 610, identifying module 110 of first computing subsystem 202 may identify one or more data sources to query for additional data related to the user and/or the first dataset.

Data sources 628A-628D illustrated in FIG. 6 represent various data sources that store various types of user data, and from which additional data may be requested. As shown in FIG. 6, data associated with the user and/or the first dataset may, for example, be requested and/or retrieved from cell phone data source 628A, voter data source 628B, consumer data source 628C, supplemental data source(s) 628D, and/or from any other suitable data source, without limitation. According to at least one embodiment, a second dataset including data related to consumer preferences of the user may be received from at least one of data sources 628A-628D and identified by identifying module 110 of first computing subsystem 202. At block 626, the second data set may be appended to the first dataset by appending module 112 so as to generate an appended dataset associated with the user.

The appended dataset formed at block 626 may be transferred to and/or stored in storage location 614 (e.g., database 120), which is accessible via interface 616. In some examples, appended data may be transferred from storage location 614 back to user data storage device 606. Such data may, for example, be combined with data subsequently received at user data storage device 606.

The appended dataset stored at storage location 614 may be accessed via an interface 616, which may include any suitable interface, such as an application programming interface (API), an application binary interface, and/or any other suitable type of interface utilized by a computing device to retrieve the first dataset.

At block 620, one or more follow-up communications to audiences having sorted and/or selected attributes may be scheduled. For example, the analysis, sorting, selection by attributes, and/or other procedures carried out at block 622 may, provide information useful for identifying potential users that may be interested in, for example, a particular product or political issue. Additionally, in at least one embodiment, at least one follow-up communication with the user associated with the appended user set may be scheduled.

According to some embodiments, at block 622 of FIG. 6, records similar and/or otherwise related to those identified by the analysis, sorting, selection by attributes, and/or other procedures carried out at block 620 may be requested from at least one computing device and/or system. Additionally, records predicted to perform similarly to those identified at block 620, and/or records useful to certain analyses of at least a portion of the appended dataset, may be requested at block 622. Such records may be useful for further analysis and processing of the appended dataset and/or for identification, analysis, and/or modification of various user characteristics.

At block 624, one or more follow-up communications to audiences having sorted and/or selected attributes may be scheduled. For example, the analysis, sorting, selection by attributes, and/or other procedures carried out at block 620 may provide information useful for identifying potential users that may be interested in, for example, a particular product or political issue. Additionally, in at least one embodiment, at least one follow-up communication with the user associated with the appended user set may be scheduled.

Figure 7:
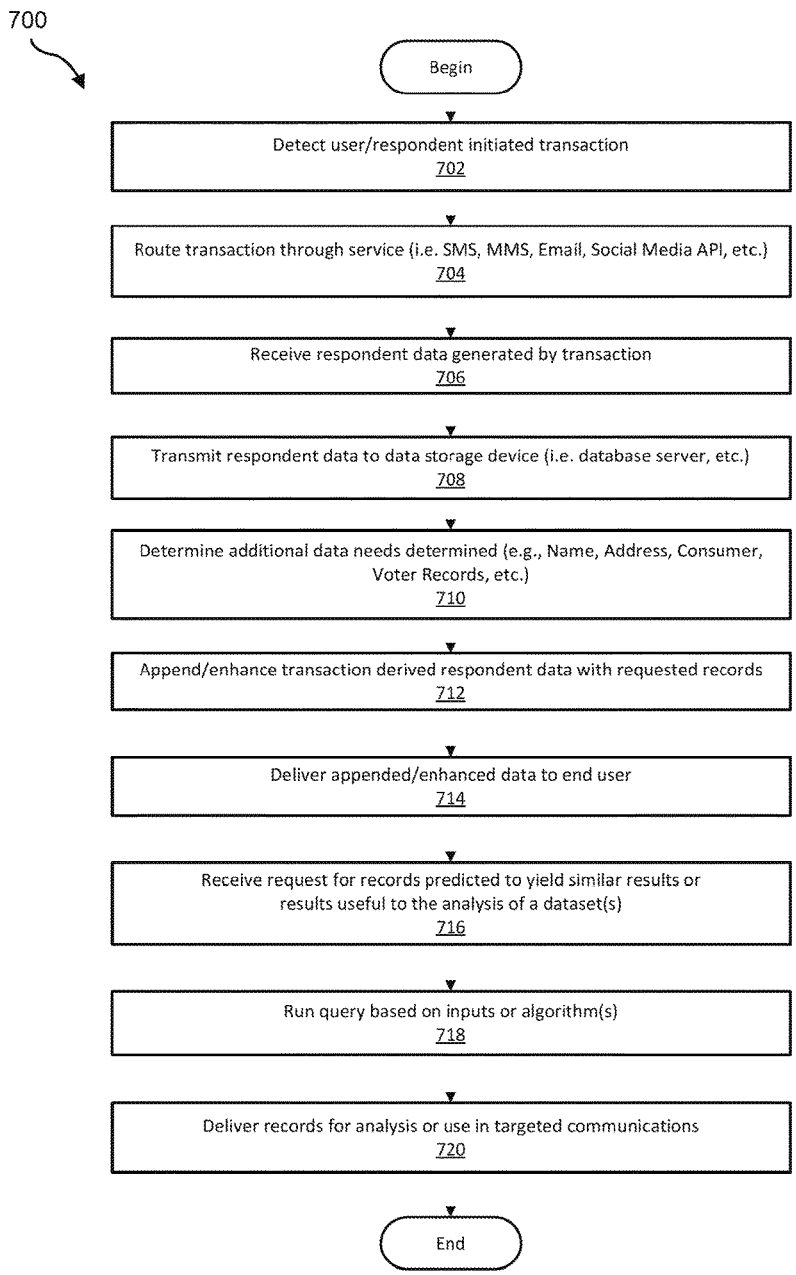
FIG. 7 is a flow diagram of an exemplary method for enhancing user data derived from digital communications.
Figure 8:
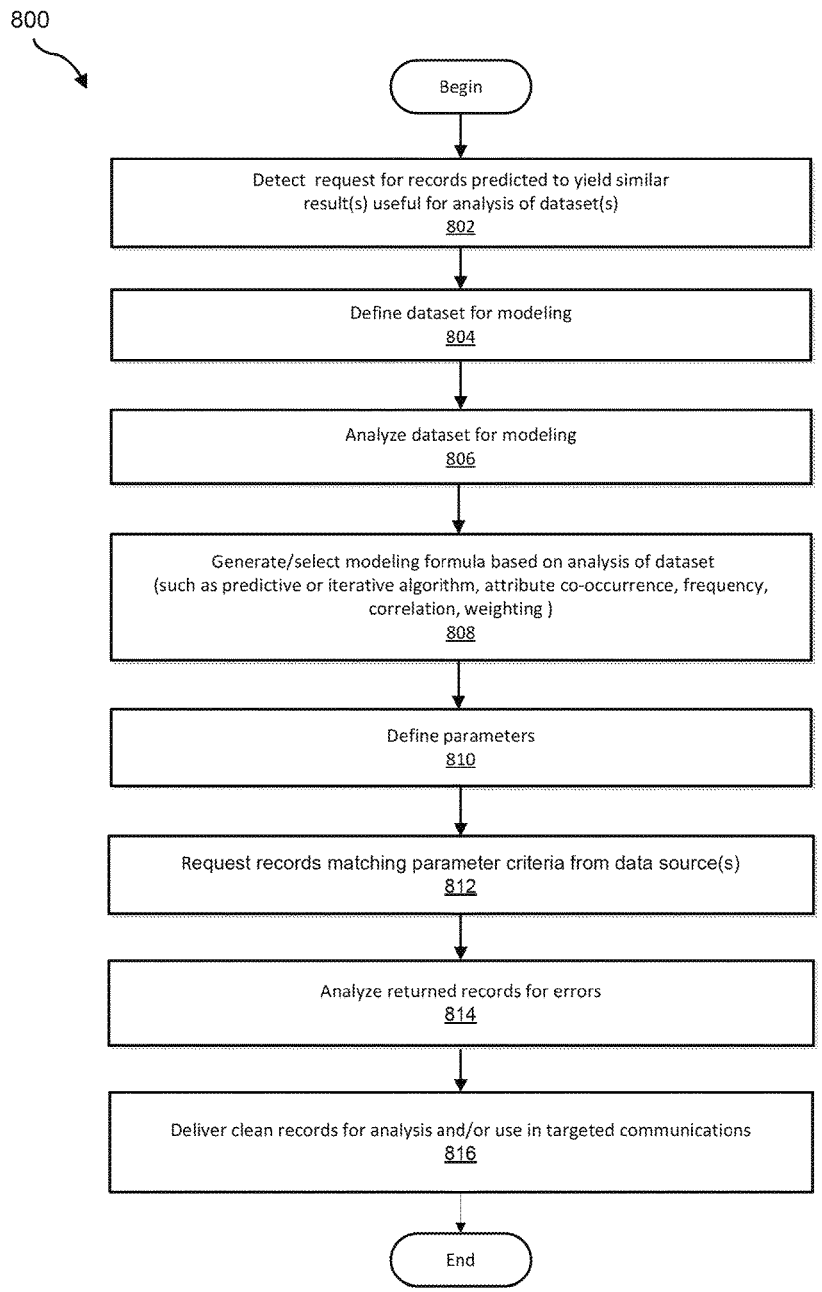
FIG. 8 is a flow diagram of an exemplary method for enhancing user data derived from digital communications.

FIGS. 7 and 8 are flow diagrams of exemplary computer-implemented methods 700 and 800 for enhancing user data derived from digital communications. The steps shown in FIGS. 7 and 8 may be performed by any suitable computer-executable code and/or computing system. In some embodiments, the steps shown in FIGS. 7 and 8 may be performed by one or more of the components of system 100 in FIG. 1, system 200 in FIG. 2, computing system 1510 in FIG. 15, and/or portions of exemplary network architecture 1600 in FIG. 16.

As illustrated in FIG. 7, at step 702, a user or respondent initiated transaction may be detected. For example, detecting module 104 may, as part of computing device 202 in FIG. 2, detect a transaction request transmitted from user computing device 206 in response to an issue-specific invitation. At step 704, the transaction initiated in step 702 may be routed through an appropriate service, such as, for example, at least one of a wireless carrier, a wired data network provider, a wireless data network provider, an SMS/MMS gateway aggregator, a social media application, an undefined user transaction interface, a digital communication facilitation medium, and/or any other suitable data transmission service or provider.

At step 706, user or respondent data generated by the transaction may be received by, for example, for example, a computing device (e.g. first computing subsystem 202 and/or second computing subsystem 208) configured to receive at least a portion of the user transaction and/or communication data. Such data may be utilized to generate a dataset, such as a first dataset, associated with the user or respondent. At step 708, the received respondent data may be transmitted to a data storage device (e.g., database 120). At step 710, additional data needs may be determined by, for example, analysis module 119 of first computing subsystem 202. Such assessment may include assessing what data is or is not included in the first dataset. Based on the assessment, additional data needs, such as for example, user name, address, voter records, consumer preference, and/or any other characteristics and/or identifying data associated with the user may be determined.

At step 712, transaction derived respondent data, such as the first dataset, may be appended and/or otherwise enhanced with additional data, data from records requested according to the additional data needs determined at step 710. For example, one or more additional datasets may be appended to the first dataset to form an appended and/or enhanced dataset. At step 714, the appended and/or enhanced dataset may be delivered to an end user, such as an individual and/or organization seeking to utilize such information in, for example, targeted outreach, fundraising, and/or marketing communications.

At step 716, a request for records predicted to yield similar results and/or results useful to the analysis of one or more datasets may be received. For example, a system client may request records from first computing subsystem 202 associated with additional users, with such records including data similar to that included in the appended dataset. According to some embodiments, data in such requested records may be predictive of similarities in various attributes and/or characteristics associated with the additional users and those attributes and/or characteristics identified in the appended dataset generated at step 712.

At step 718, a query may be made based on certain inputs and/or algorithms, such as inputs and/or algorithms associated with the request at step 716 for records predicted to yield similar results and/or results useful to the analysis of one or more datasets. The query may, for example, be directed to a database (e.g., database 120) within first computing subsystem 202 and/or second computing subsystem 208. According to some embodiments, the query may be directed one or more other databases (e.g., databases 412A-412D illustrated in FIG. 4). At step 720, records obtained in response to the query, and/or records contained within the appended dataset, may be delivered for use in targeted communications, such as, for example, targeted outreach, fundraising, and/or marketing communications.

As shown in FIG. 8, user data may be enhanced through analysis and/or modeling of the data in conjunction with additional data, such as records requested at block 422 of FIG. 4. As illustrated in FIG. 8, at step 802, a request for records predicted to yield similar results useful for analysis of at least one dataset may be detected. For example, a request may be made by a computing device (e.g., analyzing module 119) for various categories of records containing data and/or analysis of data associated with one or more individuals. Such records may be requested by, for example, querying at least one database for records meeting specified criteria.

For example, analyzing module 119 may make a request for records having characteristics similar and/or otherwise related to characteristics of a dataset (e.g., an appended dataset) derived from a user-initiated transaction and/or communication. The request may also be for data records that are predicted to yield similar results as a dataset, such as the appended dataset, and/or data records that are useful to certain analyses of at least a portion of the appended dataset. Such records may be useful for further analysis and processing of the appended dataset and/or for identification, analysis, and/or modification of various user characteristics associated with the appended dataset and/or one or more other datasets. For example, a request may return records associated with a set of individuals who would normally respond to certain issue-specific invitations (e.g., Issue #1 discussed in relation to FIG. 10); the records associated with the set of individuals may, for example, be utilized for analysis and/or modeling.

According to certain embodiments, a request for records that are not predicted to yield similar results useful for analysis of at least one dataset may be made in addition to and/or alternatively to step 802. Such a request may, for example, return records associated with a set of individuals who would not normally respond to certain issue-specific invitations (e.g., Issue #1 discussed in relation to FIG. 10). Data related to individuals who would not normally respond to a certain issue-specific invitation may, for example, enable follow up analysis and/or outreach to test responses to different messages directed to the set of users who would not normally respond. In some examples, individuals who would not normally respond to certain issue-specific invitations may be specifically excluded from future communication and/or contact related to such issues. In at least one embodiment, individuals may be either targeted or excluded based, not just on their propensity to behave similarly to a respondent group, but also based on their propensity to behave differently than the respondent group; such individuals that are determined to behave differently than the respondent group may, for example, be identified for alternative message testing and/or or targeting, or for exclusion from future message testing and/or targeting.

At step 804, a dataset for modeling (i.e., a modeling dataset) may be defined. Such a modeling dataset may comprise, for example, one or more datasets (e.g., the appended data set) that are associated with attributes of one or more users (e.g., a user of computing device 206). According to at least one embodiment, the modeling dataset may be defined prior to transmitting the records request made at step 802.

At step 806, the dataset for modeling may be analyzed. For example, analyzing module 119 may analyze the modeling dataset to determine various characteristics and/or attributes of the dataset. Various characteristics and/or attributes of the modeling dataset may be weighted based on relevance and/or other determining criteria previously input and utilized by analyzing module 119. Correlations between various data attributes may also be determined during the analysis.

At step 808, a modeling formula based on analysis of the modeling dataset may be selected and/or generated. Additionally, a model utilizing the modeling formula may be newly generated and/or modified. For example, following analysis of the modeling data, analyzing module 119 may select from among one or more modeling formulas based on certain predefined criteria. According to some embodiments, a modeling formula may be newly generated based on the analysis of the modeling data. The modeling formula may comprise any suitable formula designed to yield desired information related to modeled user data, such as dataset and/or records related to one or more users. The modeling formula may include, without limitation, a predictive and/or iterative algorithm configured to utilize and/or determine attribute co-occurrence data, attribute frequency data, attribute correlation data, and/or attribute weighting factors.

At step 810, parameters for data (e.g., records) to be requested may be defined. For example, record data parameters may be selected from a set of stored predefined parameters. Parameters may be defined, for instance, to include only records associated with a subset of overall respondents initially identified and/or modeled in the modeling dataset. For example, parameters may identify characteristics of various user records so as to only include records exhibiting the identified characteristics, while excluding user records not exhibiting the identified characteristics from the modeling and/or analysis. In at least one embodiment, user records falling outside the identified parameters may be modeled under a separate modeling formula. In some embodiments, parameters may be automatically and/or manually selected. For example, an end user may select and/or input appropriate parameters. In at least one embodiment, the modeling formula may be applied to the modeling dataset to determine the appropriate parameters.

At step 812, records matching the defined parameter criteria may be requested. For example, analyzing module 119 may query one or more databases for appropriate records matching the defined parameters. At step 814, records returned in response to the records request may be analyzed for errors. For example, the returned records may be cross-checked with similar records to determine if certain data points in the returned records conflict with known information. For example, a returned record having a user age that conflicts with a known age for the same user may be determined to contain an erroneous user age. Errors and/or possible errors identified in the returned records may be removed or otherwise noted and/or flagged by, for example, analyzing module 119.

At step 816, clean records may be delivered for analysis and/or otherwise used in targeted communications. For example, records having errors removed may be utilized in, for example, targeted outreach, fundraising, and/or marketing communications. Such records may also be further analyzed for various attributes and/or correlations. The returned records may also be utilized in further data modeling.

Figure 9:
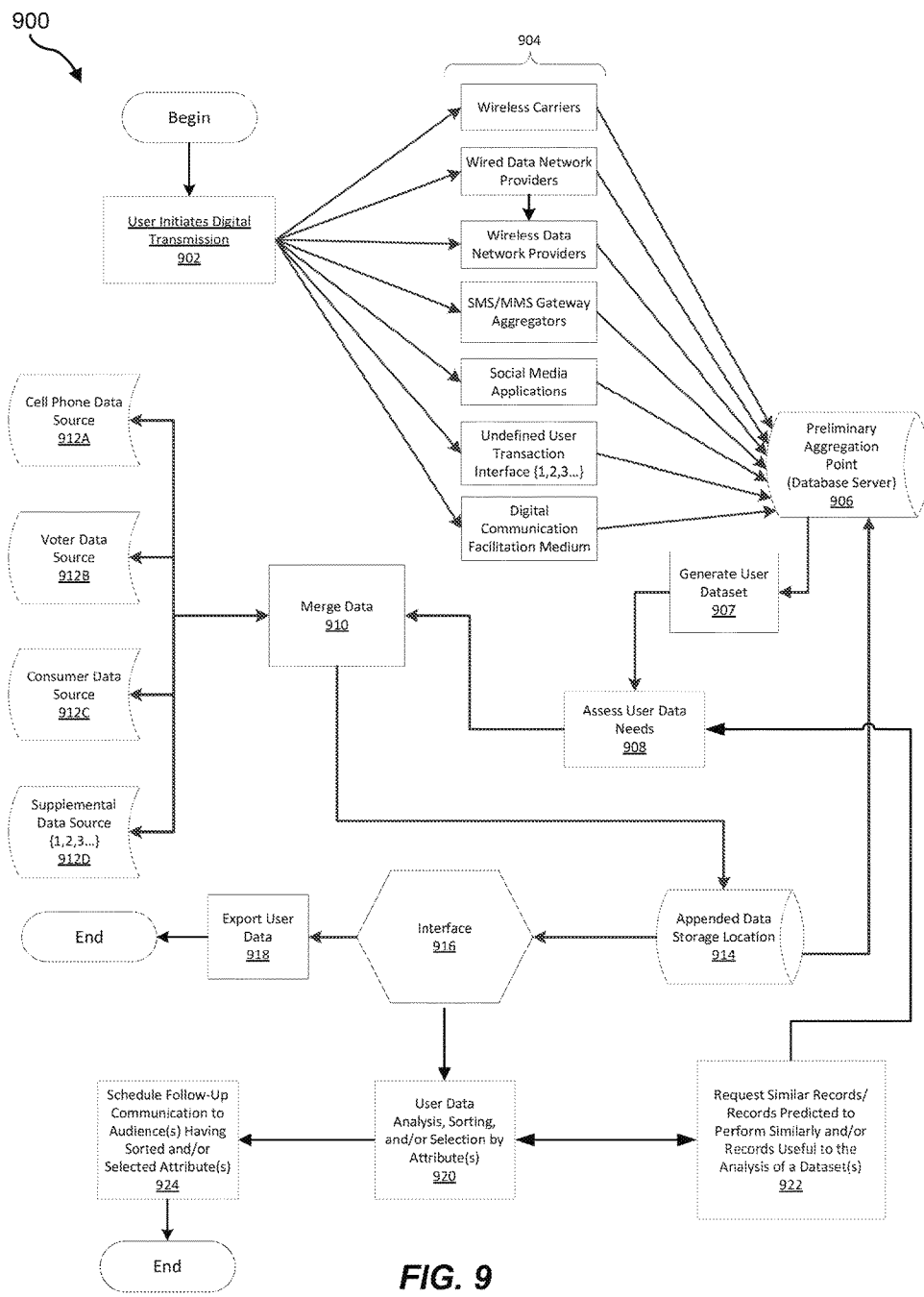
FIG. 9 is a flow diagram illustrating a process flow of an exemplary system for enhancing user data derived from digital communications.

As illustrated in FIG. 9, at block 902, a user may initiate a transaction and/or a communication. For example, a user of user computing device 206 may initiate a transaction and/or a communication via network 204. The transaction and/or communication may be initiated in response to an invitation. For example, a user of user computing device 206 may initiate the transaction and/or communication in response to an issue-specific invitation.

The transaction and/or communication initiated by the user may be transmitted over a network via any suitable type of transmission service or means, without limitation. Blocks 904 illustrate exemplary paths for transmitting the transaction and/or communication initiated in block 902. For example, the user-initiated transaction and/or communication may be transmitted from computing device 206 to another computing device (e.g., computing subsystem 202 and/or second computing subsystem 208) by at least one of a wireless carrier, a wired data network provider, a wireless data network provider, an SMS/MMS gateway aggregator, a social media application, an undefined user transaction interface, a digital communication facilitation medium, and/or any other suitable data transmission service or provider.

User transaction and/or communication data transmitted via one or more of blocks 904 may be received at a preliminary aggregation point 406. Preliminary aggregation point 406 may comprise, for example, a database configured to receive at least a portion of the user transaction and/or communication data. In some embodiments, the preliminary aggregation point 406 may, for example, comprise a database (e.g., database 120) located on first computing subsystem 202, second computing subsystem 208, and/or any computing subsystem connected to network 204.

At block 907, a user dataset (e.g., a first dataset) may be generated by, for example, generating module 106 of first computing subsystem 202. The transmitted transaction and/or communication data may be used to generate a dataset associated with the user, such as a first dataset, based on the transaction and/or communication request. At block 908, user data needs may be assessed by, for example, analyzing module 119 of first computing subsystem 202. Such assessment may include assessing what data is or is not included in the first dataset generated at block 907 from the data received and/or stored at preliminary aggregation point 906.

At block 910, the dataset may be merged with additional data. For example, based on the assessment of user data needs in block 908, identifying module 110 of first computing subsystem 202 may identify one or more data sources to query for additional data related to the user and/or the first dataset. Data sources 912A-912D illustrated in FIG. 9 represent various data sources that store various types of user data, and from which additional data may be requested. As shown in FIG. 9, data associated with the user and/or the first dataset may, for example, be requested and/or retrieved from cell phone data source 912A, voter data source 912B, consumer data source 912C, one or more supplemental data source(s) 912D, and/or from any other suitable data source, without limitation. According to at least one embodiment, a second dataset including data related to consumer preferences of the user may be received from at least one of data sources 912A-912D and identified by identifying module 110 of first computing subsystem 202. At block 910, the second data set may be appended to the first dataset by appending module 112 so as to generate an appended dataset associated with the user.

According to various embodiments, the appended dataset formed at block 910 may be transferred to and/or stored in a storage location 914 (e.g., database 120). In some examples, appended data may be transferred from storage location 914 back to preliminary aggregation point 906 where data from the user-initiated transaction is received, aggregated, and/or stored. Such data may be combined with data subsequently received at preliminary aggregation point 906. The appended data in storage location 914 may also be accessed via an interface 916. Interface 916 may include any suitable interface for interacting with a device storing the appended data. For example, interface 916 may include an application programming interface (API), an application binary interface, and/or any other suitable type of interface may be utilized by a computing device to retrieve the appended data from storage location 914.

According to at least one example, the appended dataset may be transmitted to another storage location, such as a database (e.g., database 120) located on first computing subsystem 202 and/or second computing subsystem 208. In additional embodiments, as illustrated in FIG. 9 at block 918, the appended dataset may be exported via interface 916 or any other suitable transmission route, to another storage location, such as a user database for storing various user data, located on one or more computing devices and/or servers located external to first computing subsystem 202 and/or second computing subsystem 208.

In various embodiments, the appended dataset may be accessed via interface 916 for any suitable purposes, without limitation. For example, as illustrated at block 920 of FIG. 9, and as will be described in greater detail below, the appended dataset may be accessed via interface 916 for purposes of one or more activities, including, without limitation, formatting, analyzing, sorting, filtering, selecting, and/or otherwise manipulating at least a portion of the appended data based on one or more attributes of the appended dataset.

According to some embodiments, at block 922 of FIG. 9, records similar and/or otherwise related to those identified by the analysis, sorting, selection by attributes, and/or other procedures carried out at block 920 may be requested from at least one computing device and/or system. Additionally, records predicted to perform similarly to those identified at block 920, and/or records useful to certain analyses of at least a portion of the appended dataset, may be requested at block 922. Such records may be useful for further analysis and processing of the appended dataset and/or for identification, analysis, and/or modification of various user characteristics. Additionally, the records requested at block 922 may be received and utilized, in conjunction with the first dataset generated at block 907, for assessing user data needs at block 908.

At block 924, one or more follow-up communications to audiences having sorted and/or selected attributes may be scheduled. For example, the analysis, sorting, selection by attributes, and/or other suitable procedures carried out at block 920 may provide information useful for identifying potential users that may be interested in, for example, a particular product or political issue. Additionally, in at least one embodiment, at least one follow-up communication with the user associated with the appended user set may be scheduled.

FIGS. 10-13 are flow diagrams of exemplary computer-implemented methods 1000, 1100, 1200, and 1300 for enhancing user data derived from digital communications. The steps shown in FIGS. 10-13 may be performed by any suitable computer-executable code and/or computing system. In some embodiments, the steps shown in FIGS. 10-13 may be performed by one or more of the components of system 100 in FIG. 1, system 200 in FIG. 2, computing system 1510 in FIG. 15, and/or portions of exemplary network architecture 1600 in FIG. 16.

Figure 10:
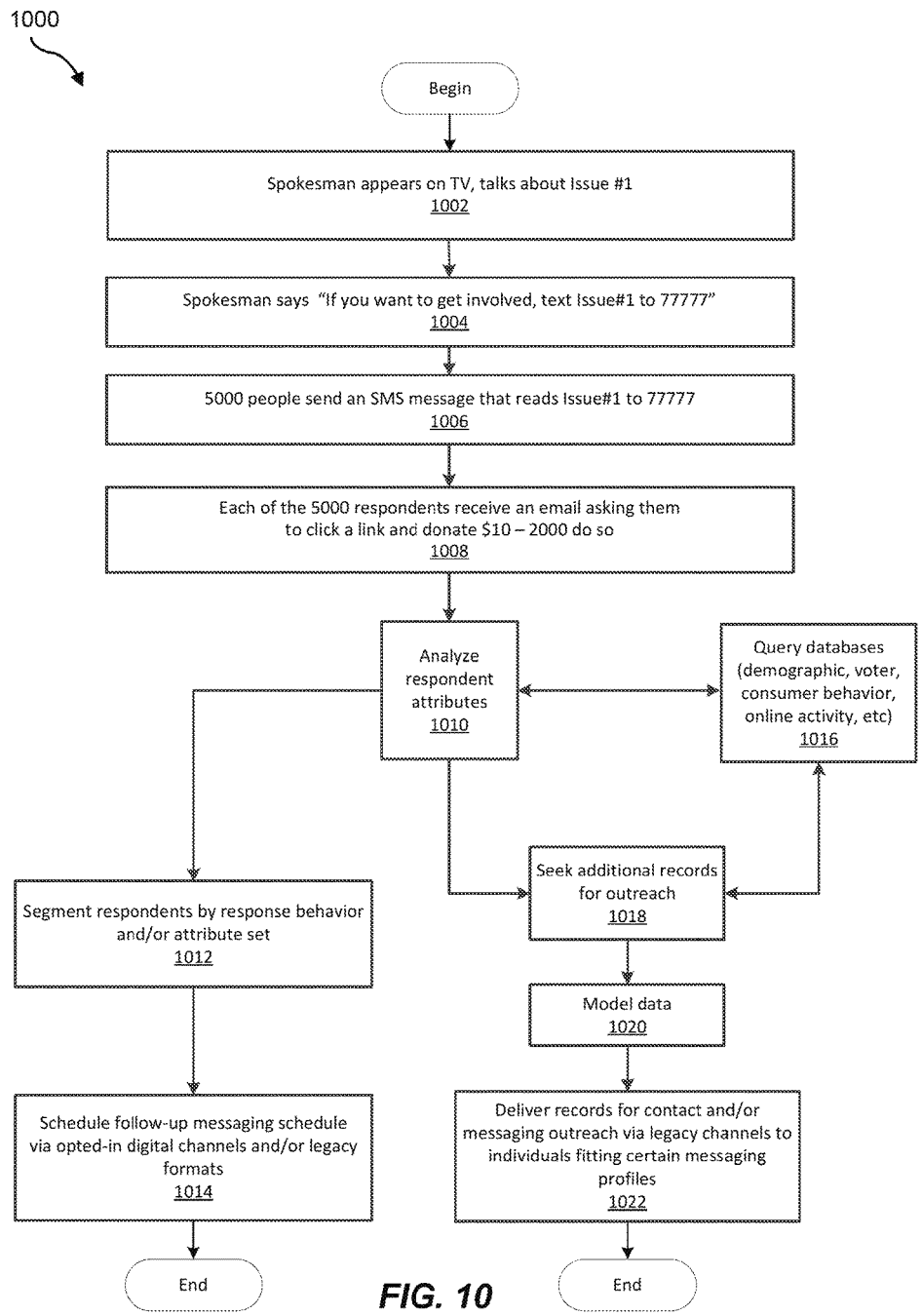
FIG. 10 is a flow diagram of an exemplary method for enhancing user data derived from digital communications.

As illustrated in FIG. 10, at step 1002, a spokesman appearing on television may talk about "Issue #1." Issue #1 may comprise, for example, one or more specified issues, causes, topics, individuals, entities, and/or events, without limitation. At step 1004, the spokesman may indicate a means for requesting a transaction and/or communication specifically related to Issue #1, thereby presenting television viewers with an issue-specific invitation. For example, the spokesman may say "If you want to get involved, text Issue #1 to 77777."

In response to the issue-specific invitation, at step 1006, one or more viewers (e.g., users of user computing devices) may respond to the issue-specific invitation by sending a communication in the manner specified by the spokesman, thereby initiating a communication request in response to the issue-specific invitation. As illustrated in FIG. 10, for example, 5000 people may send an SMS message that reads "Issue #1" to number 77777. The SMS text responses from the 5000 people may be received by, for example, receiving module 118 of first computing subsystem 202 and/or by second computing subsystem 208. First computing subsystem 202 may detect receipt of the SMS text responses at first computing subsystem 202 and/or at second computing subsystem 208.

According to some examples, upon receipt of the SMS text responses from the 5000 individuals, at least some of the 5000 respondents may be sent a follow-up message from, for example, first computing subsystem 202 and/or second computing subsystem 208. For example, an email message may be sent to and received by each of the 5000 individuals; the email may, for example, instruct the recipients to click an HTML link and make a monetary donation (e.g., $10). Out of all the recipients of the email, at least some of the individuals may respond by making a donation. For example, 2000 of the 5000 individuals responding to the television advertisement may subsequently make a $10 donation in response to the email. By clicking the HTML link and filling out a form to make the donation, each of the 2000 individuals initiates a monetary transaction request. Detecting module 104 of first computing subsystem 202, for example, may detect that the transaction requests have been initiated from various user computing devices.

At step 1010, various attributes of the individuals responding to the emails by making donations may be analyzed. For example, first computing subsystem 202 and/or second computing subsystem 208 may analyze the attributes associated with each of the users in comparison with other user attributes. In some examples, analyzing module 119 may analyze for patterns and/or associations between various attributes of any one or more of the respondents. At least one of the attributes analyzed may include, for example, respondents' interest in and/or propensity to contribute to Issue #1. At step 1012, the respondents may be segmented based on, for example, response behavior and/or attribute set. For example, respondents that donated money in response to the email may be segmented into a different group than those that merely responded to the text message but did not donate.

At step 1014, follow-up messaging with the respondents may be scheduled with the respondents. For example, the respondents may be given an opportunity to opt-in to further communications via any suitable channels, including digital channels and/or legacy channels. Such further communications may be catered to specific interests and/or attributes of each segment of respondents. For example, respondents may opt-in to receive email and/or SMS text notifications related to Issue #1. Additionally, respondents that opt-in may receive communications related to issues that are determined, via the analysis at step 1010 or otherwise, to likely be of interest to the particular respondents based on their individual set of user attributes.

In some examples, at step 1016, one or more databases may be queried for additional data related to various respondents. For example, analysis module 119 may query various databases for any desired information related to respondents, including, for example, demographic records, voter records, consumer behavior records, online activity, and/or any other suitable information. Information, such as reports, received in response to such queries may be utilized in the analysis of respondent attributes at step 1010.

In some embodiments, at step 1018, additional data, such as records, may, for example, be sought for targeted outreach, fundraising, marketing, communications initiatives and/or for any other suitable purposes. For example, an organization may wish to correlate various respondent attributes to make determinations and/or predictions concerning interests of various individuals and/or to identify potential individuals for targeted outreach initiatives. At step 1020, data may be modeled in order to, for example, identify additional correlations between various user attributes, to determine certain preferences of target groups of individuals, and/or to identify groups that may be interested in specific issues. For example, analyzing module 119 may assemble and model data received from the respondent-initiated communications and/or transactions in conjunction with additional data (e.g., appending data) received from databases in response to record queries to identify correlations between various respondent attributes.

In some embodiments, at step 1022, records related to the modeling at step 1020 may be delivered to end users, such as organizations, for use in any suitable targeted outreach, fundraising, marketing, communications initiatives and/or other suitable purposes. For example, such records may be utilized by organizations in conducting messaging outreach via any suitable channels, such as legacy channels, to individuals fitting certain messaging profiles identified in the records.

Figure 11:
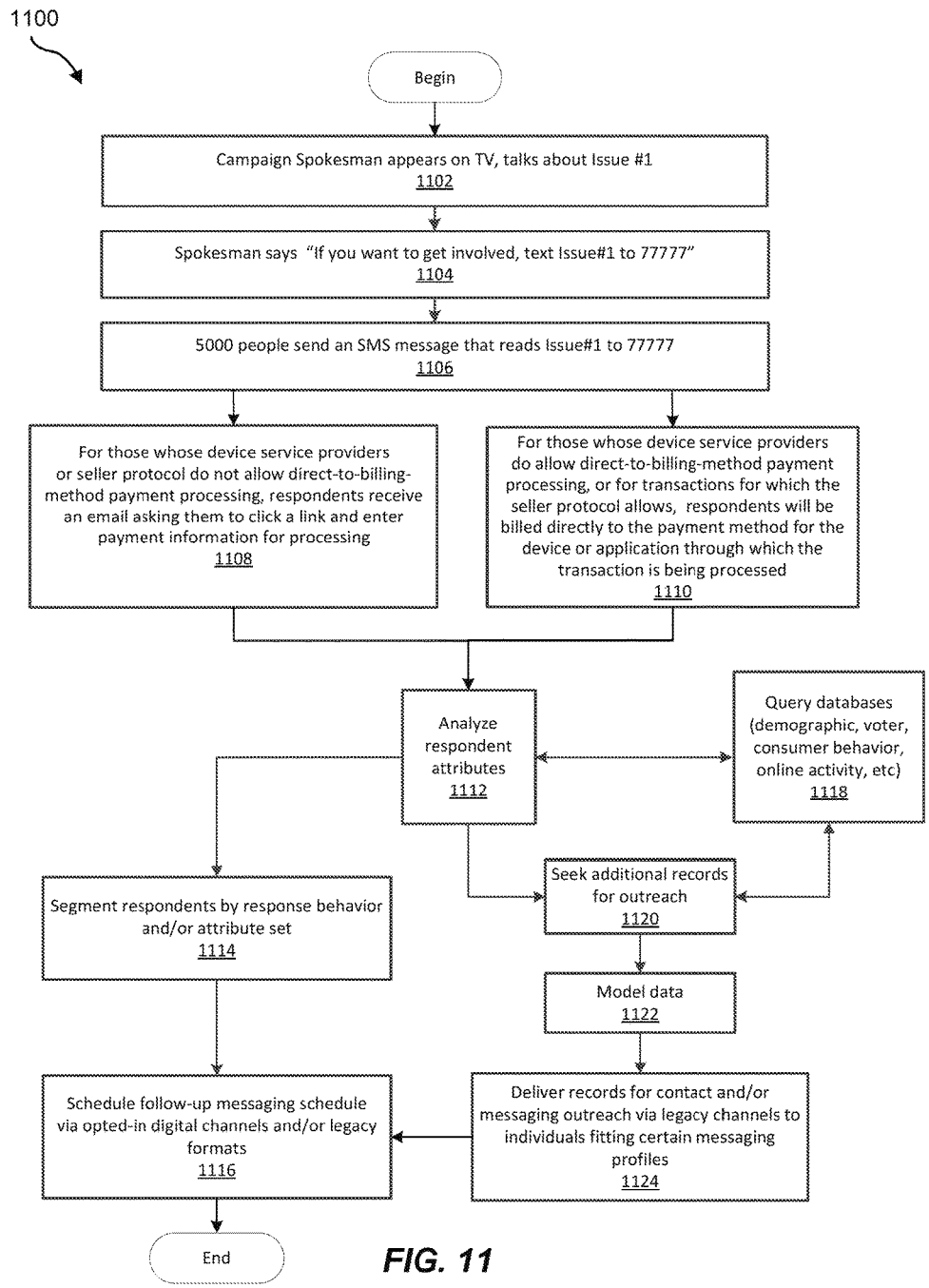
FIG. 11 is a flow diagram of an exemplary method for enhancing user data derived from digital communications.

As illustrated in FIG. 11, at step 1102, a campaign spokesman appearing on television may talk about "Issue #1." Issue #1 may comprise, for example, one or more specified issues, causes, topics, individuals, entities, and/or events, without limitation. According to at least one embodiment, the campaign spokesman may be a spokesman for a political candidate and/or political issue campaign. At step 1104, the campaign spokesman may indicate a means for requesting a transaction and/or communication specifically related to Issue #1, thereby presenting television viewers with an issue-specific invitation. For example, the spokesman may say "If you want to get involved, text Issue #1 to 77777."

In response to the issue-specific invitation, at step 1106, one or more viewers (e.g., users of user computing devices) may respond to the issue-specific invitation by sending a communication in the manner specified by the spokesman, thereby initiating a communication request in response to the issue-specific invitation. As illustrated in FIG. 11, for example, 5000 people may send an SMS message that reads "Issue #1" to number 77777. The SMS text responses from the 5000 people may be received by, for example, receiving module 118 of first computing subsystem 202 and/or by second computing subsystem 208.

According to some examples, upon receipt of the SMS text responses from the 5000 individuals, at least some of the 5000 respondents may be sent a follow-up message from, for example, first computing subsystem 202 and/or second computing subsystem 208. For example, at step 1108, an email message may be sent to respondents whose computing device service providers (e.g., cell phone providers) do not allow direct-to-billing-method payment processing. The email may, for example, instruct the recipients to click an HTML link and enter payment information for processing a monetary donation (e.g., $10). Out of all the recipients of the email, at least some of the individuals may respond by making a donation.

Alternatively, at step 1110, for respondents whose device service providers do allow direct-to-billing-method payment processing (e.g., text-to-donate, etc.), or for transactions for which the seller protocol allows, respondents may be billed directly to the payment method for the device or application through which the transaction is being processed. For example, by texting "Issue #1" to 77777 using a cell phone, a payment of $10 may be applied to a respondent's cell phone service bill and/or directly to an account linked to the cell phone service account.

At step 1112, various attributes of the individuals responding to the emails by making donations, and/or of the individuals making direct-to-billing payment, may be analyzed. At step 1114, the respondents may be segmented based on, for example, response behavior and/or attribute set. At step 1116, follow-up messaging with the respondents may be scheduled with the respondents.

In some examples, at step 1118, one or more databases may be queried for additional data related to various respondents. For example, analysis module 119 may query various databases for any desired information related to respondents, including, for example, demographic records, voter records, consumer behavior records, online activity, and/or any other suitable information. Information, such as reports, received in response to such queries may be utilized in the analysis of respondent attributes at step 1112.

At step 1120, additional data, such as records, may, for example, be sought for targeted outreach, fundraising, marketing, communications initiatives and/or for any other suitable purposes. At step 1122, data may be modeled in order to, for example, identify additional correlations between various user attributes, to determine certain preferences of target groups of individuals, and/or to identify groups that may be interested in specific issues. For example, analyzing module 119 may assemble and model data received from the respondent-initiated communications and/or transactions (e.g., billing in response to email or direct-to-billing) in conjunction with additional data (e.g., appending data) received from databases in response to record queries to identify correlations between various respondent attributes. In some embodiments, at step 1124, records related to the modeling at step 1120 may be delivered to end users, such as organizations, for use in any suitable targeted outreach, fundraising, marketing, communications initiatives and/or other suitable purposes.

Figure 12:
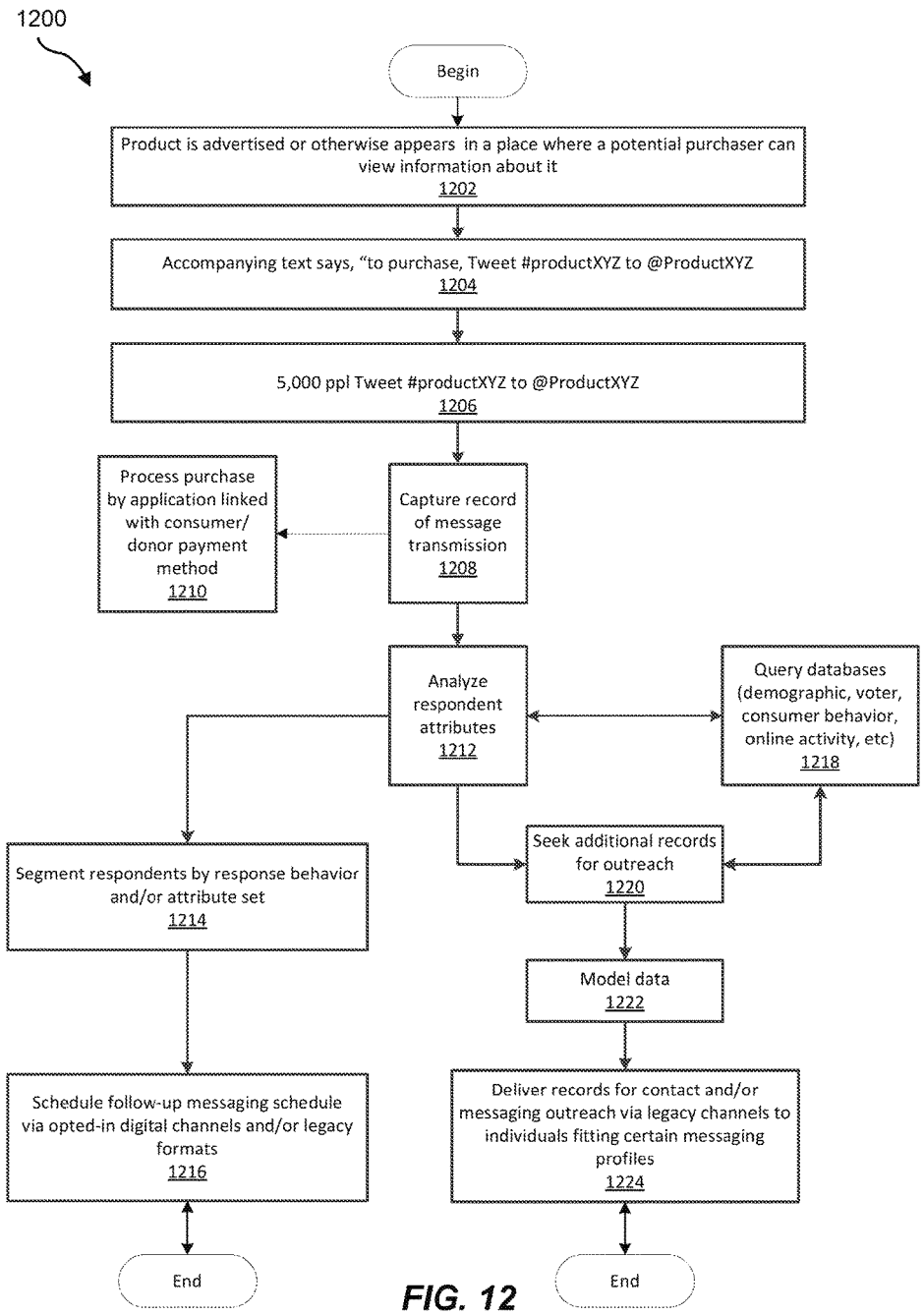
FIG. 12 is a flow diagram of an exemplary method for enhancing user data derived from digital communications.

As illustrated in FIG. 12, at step 1202, a product may be advertised or otherwise appear in a place where a potential purchaser may view information about it. For example, a billboard, vendor product display, media display (e.g., television, newspaper, web page, etc.), and/or any other suitable advertisement may display a product. According to at least one example, the advertisement may indicate a means for requesting a transaction and/or communication specifically related to the advertised product, thereby presenting viewers with an issue-specific and/or product-specific invitation. At step 1204, text accompanying the advertisement may say, for example, "to Purchase, Tweet #productXYZ to @ProductXYZ."

In response to the issue-specific/product-specific invitation, at step 1206, one or more viewers (e.g., users of user computing devices) may respond to the issue-specific invitation by initiating a communication and/or transaction request via their respective computing devices in the manner specified in the advertisement. As illustrated in FIG. 12, for example, 5000 people may send a tweet "#productXYZ to @Product XYZ" via an appropriate application (e.g., TWITTER). At step 1208, a record of message transmission (e.g., posting of tweet on TWITTER) may be captured. Records of the responses from the 5000 people may be received by, for example, receiving module 118 of first computing subsystem 202 and/or by second computing subsystem 208.

At step 1210, respondents may be billed for a purchase of the advertised product by an application linked with a consumer and/or donor payment method. For example, an application may enable a charge to be applied to a respondent account for the cost of the advertised product, along with any shipping or other fees, based on the sent tweet directing the charge to be made. At step 1212, various attributes of the individuals responding to the emails by making donations, and/or of the individuals making direct-to-billing payment, may be analyzed. At step 1214, the respondents may be segmented based on, for example, response behavior and/or attribute set. At step 1216, follow-up messaging with the respondents may be scheduled with the respondents.

In some examples, at step 1218, one or more databases may be queried for additional data related to various respondents. For example, analysis module 119 may query various databases for any desired information related to respondents, including, for example, demographic records, voter records, consumer behavior records, online activity, and/or any other suitable information. Information, such as reports, received in response to such queries may be utilized in the analysis of respondent attributes at step 1212.

At step 1220, additional data, such as records, may, for example, be sought for targeted outreach, fundraising, marketing, communications initiatives and/or for any other suitable purposes. At step 1222, data may be modeled in order to, for example, identify additional correlations between various user attributes, to determine certain preferences of target groups of individuals, and/or to identify groups that may be interested in specific issues. For example, analyzing module 119 may assemble and model data received from the respondent-initiated communications and/or transactions (e.g., billing in response to email or direct-to-billing) in conjunction with additional data (e.g., appending data) received from databases in response to record queries to identify correlations between various respondent attributes. In some embodiments, at step 1224, records related to the modeling at step 1220 may be delivered to end users, such as organizations, for use in any suitable targeted outreach, fundraising, marketing, communications initiatives and/or other suitable purposes.

Figure 13:
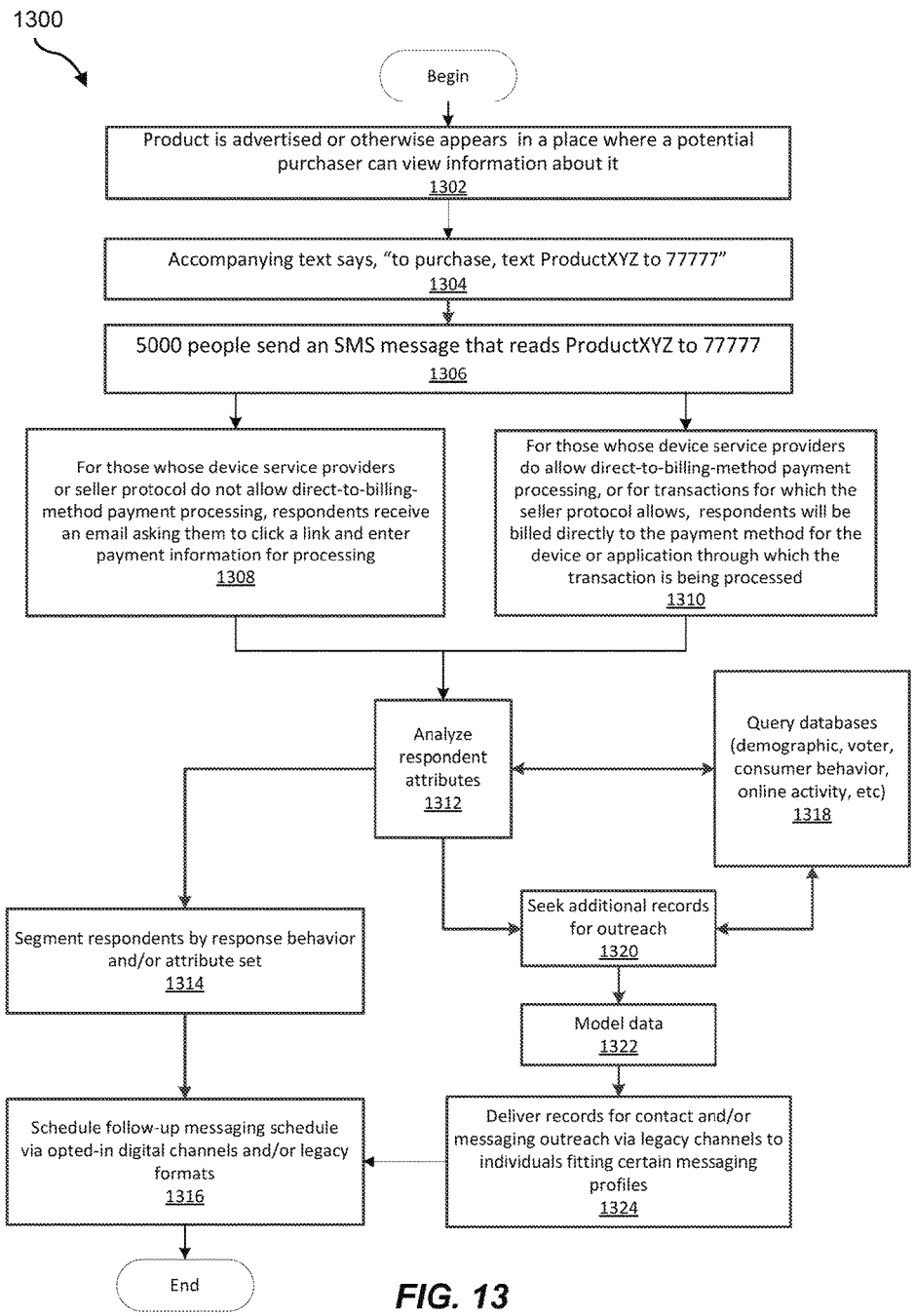
FIG. 13 is a flow diagram of an exemplary method for enhancing user data derived from digital communications.

As illustrated in FIG. 13, at step 1302, a product may be advertised or otherwise appear in a place where a potential purchaser may view information about it. According to at least one example, the advertisement may indicate a means for requesting a transaction and/or communication specifically related to the advertised product, thereby presenting viewers with an issue-specific and/or product-specific invitation. At step 1304, text accompanying the advertisement may say, for example, "to Purchase, text ProductXYZ to 77777."

In response to the issue-specific/product-specific invitation, at step 1306, one or more viewers (e.g., users of user computing devices) may respond to the issue-specific invitation by initiating a communication and/or transaction request via their respective computing devices in the manner specified in the advertisement. As illustrated in FIG. 13, for example, 5000 people may send an SMS text message that reads "ProductXYZ" to number 77777. The SMS text responses from the 5000 people may be received by, for example, receiving module 118 of first computing subsystem 202 and/or by second computing subsystem 208. Detecting module 104 of first computing subsystem 202 may detect receipt of the SMS text responses at first computing subsystem 202 and/or at second computing subsystem 208.

At step 1308, an email message may be sent to respondents whose computing device service providers (e.g., cell phone providers) do not allow direct-to-billing-method payment processing. The email may, for example, instruct the recipients to click an HTML link and enter payment information for processing payment for the purchased product. Alternatively, at step 1310, for respondents whose device service providers do allow direct-to-billing-method payment processing (e.g., text-to-donate, etc.), or for transactions for which the seller protocol allows, respondents may be billed directly to the payment method for the device or application through which the transaction is being processed. For example, by texting "ProductXYZ" to 77777 using a cell phone, a payment for the advertised product may be applied to a respondent's cell phone service bill and/or directly to an account linked to the cell phone service account.

At step 1312, various attributes of the individuals responding to the emails by making donations, and/or of the individuals making direct-to-billing payment, may be analyzed. At step 1314, the respondents may be segmented based on, for example, response behavior and/or attribute set. At step 1316, follow-up messaging with the respondents may be scheduled with the respondents.

In some examples, at step 1318, one or more databases may be queried for additional data related to various respondents. For example, analysis module 119 may query various databases for any desired information related to respondents, including, for example, demographic records, voter records, consumer behavior records, online activity, and/or any other suitable information. Information, such as reports, received in response to such queries may be utilized in the analysis of respondent attributes at step 1312.

At step 1320, additional data, such as records, may, for example, be sought for targeted outreach, fundraising, marketing, communications initiatives and/or for any other suitable purposes. At step 1322, data may be modeled in order to, for example, identify additional correlations between various user attributes, to determine certain preferences of target groups of individuals, and/or to identify groups that may be interested in specific issues. For example, analyzing module 119 may assemble and model data received from the respondent-initiated communications and/or transactions (e.g., billing in response to email or direct-to-billing) in conjunction with additional data (e.g., appending data) received from databases in response to record queries to identify correlations between various respondent attributes. In some embodiments, at step 1324, records related to the modeling at step 1320 may be delivered to end users, such as organizations, for use in any suitable targeted outreach, fundraising, marketing, communications initiatives and/or other suitable purposes.

Figure 14:
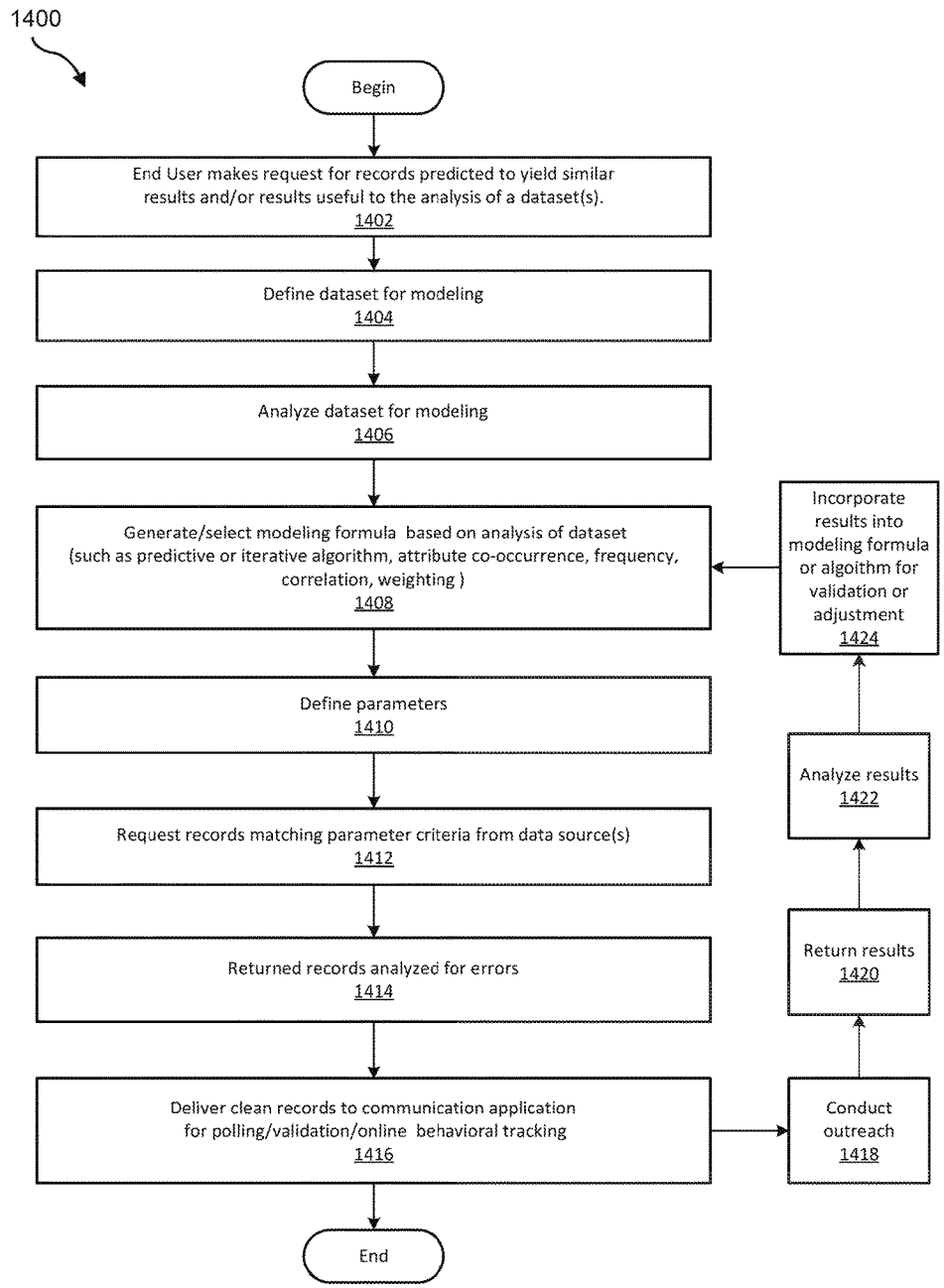
FIG. 14 is a flow diagram of an exemplary method for enhancing user data derived from digital communications.

FIG. 14 is a flow diagram of an exemplary computer-implemented method 1400 for enhancing user data derived from digital communications. The steps shown in FIG. 14 may be performed by any suitable computer-executable code and/or computing system. In some embodiments, the steps shown in FIG. 14 may be performed by one or more of the components of system 100 in FIG. 1, system 200 in FIG. 2, computing system 1510 in FIG. 15, and/or portions of exemplary network architecture 1600 in FIG. 16.

As shown in FIG. 14, user data may be enhanced through analysis and/or modeling of the data in conjunction with additional data, such as records requested at block 422 of FIG. 4. As illustrated in FIG. 14, at step 1402, a request for records predicted to yield similar results useful for analysis of at least one dataset may be detected. For example, a request may be made by a computing device (e.g., analyzing module 119) for various categories of records containing data and/or analysis of data associated with one or more individuals. Such records may be requested by, for example, querying at least one database for records meeting specified criteria. According to certain embodiments, a request for records that are not predicted to yield similar results useful for analysis of at least one dataset may be made in addition to and/or alternatively to step 1402.

At step 1404, a dataset for modeling (i.e., a modeling dataset) may be defined. Such a modeling dataset may comprise, for example, one or more datasets (e.g., the appended data set) that are associated with attributes of one or more users (e.g., a user of computing device 206). At step 1406, the dataset for modeling may be analyzed. For example, analyzing module 119 may analyze the modeling dataset to determine various characteristics and/or attributes of the dataset.

At step 1408, a modeling formula based on analysis of the modeling dataset may be selected and/or generated. For example, following analysis of the modeling data, analyzing module 119 may select from among one or more modeling formulas based on certain predefined criteria. The modeling formula may include, without limitation, a predictive and/or iterative algorithm configured to utilize and/or determine attribute co-occurrence data, attribute frequency data, attribute correlation data, and/or attribute weighting factors.

At step 1410, parameters for data (e.g., records) to be requested may be defined. At step 1412, records matching the defined parameter criteria may be requested. For example, analyzing module 119 may query one or more databases for appropriate records matching the defined parameters. At step 1414, records returned in response to the request may be analyzed for errors. At step 1416, clean records may be delivered for analysis and/or used in targeted communications. For example, records having errors removed may be utilized in, for example, targeted outreach, fundraising, and/or marketing communications. Such records may also be further analyzed for various attributes and/or correlations. The returned records may also be utilized in further data modeling.

According to some embodiments, additional data may be obtained and utilized to modify the modeling formula and/or one or more parameters associated with the modeling formula. For example, at step 1418, targeted outreach, fundraising, and/or marketing communications may be conducted. At step 1420, results of the targeted activities may be returned. For example, results may be returned to analyzing module 119 of first computing subsystem 202. At step 1422, the returned results may be analyzed. Subsequently, at step 1424, the returned and analyzed results may be incorporated into the modeling formula and/or into an algorithm for validation or adjustment of the modeling formula and/or defined parameters. Steps 1408-1424 may be repeated as often as necessary or desired in order to further refine the modeling formula so as to produce a more accurate and/or predictive user data model.

In additional embodiments, outreach to user populations having certain characteristics mirroring (i.e., mirror populations) those of respondents (as described above) may be conducted by one or more of the systems described herein. Mirror population respondents responding to the outreach activities may be captured, enhanced, and/or appended with additional data. In some examples, modeling criteria and/or algorithms may be automatically enhanced with mirrored population response data points. According to at least one embodiment, data indicating various user attributes, behaviors, attitudes, potential to take certain actions, purchase or not purchase certain goods or services, hold certain beliefs or "worldviews", vote for or against certain political candidates, or predict participation in the political process or elections, may be correlated by one or more of the systems described herein.

According to at least one embodiment, social media and/or other available user accounts for identified respondents and/or mirror population targets identified by various processes, as outlined above, may, for example, be targeted for auto-follow, auto-friend, and/or targeted advertising and/or other suitable outreach via any acceptable channel. For example, identified individuals may be targeted for follow-up via a suitable social media interface, webservice, and/or other suitable platform interaction channel. Tracking data, behavioral data, interaction data, lingual data, semantic data, and/or sentiment data obtained through various interactions (e.g., auto-interactions, auto-follow, etc) may be captured. Captured data may then be integrated into respondent/cluster modeling formulas.

According to various embodiments, custom advertising, messages, information, and/or system-generated interactions, may be delivered to, for example, social media and/or other suitable user accounts based on at least one of modeling/clustering, lingual, sentiment, and/or behavioral data, and/or automated interactions. Such gathered and/or utilized data may be used to automatically and/or manually update existing respondent/user models. According to at least one embodiment, automated communication with and/or analysis of respondents, modeled sample groups, and/or other groups, for validation of modeling results and/or production of data to adjust a modeling formula and/or algorithm may be generated through, for example, automated or manual robocalling, IVR, predictive dialing, SMS, MMS, mobile messaging applications, social media applications, automated behavioral tracking, and/or other software applications, computer programs, and/or method by which data can be extracted by an automated means.

According to some embodiments, an interface may be utilized in any of the systems and/or methods described herein. Such an interface may enable data records to be appended and/or enhanced, and/or may enable additional data records to be modeled to reflect specific attributes. The interface may also be used to enable data records and/or enhanced data to be uploaded and/or sorted. Additionally, the interface may direct and/or broadcast specified messages (e.g., SMS, MMS, email, video, system-to-social media profile, system-to-social media interface, etc.).

Figure 15:
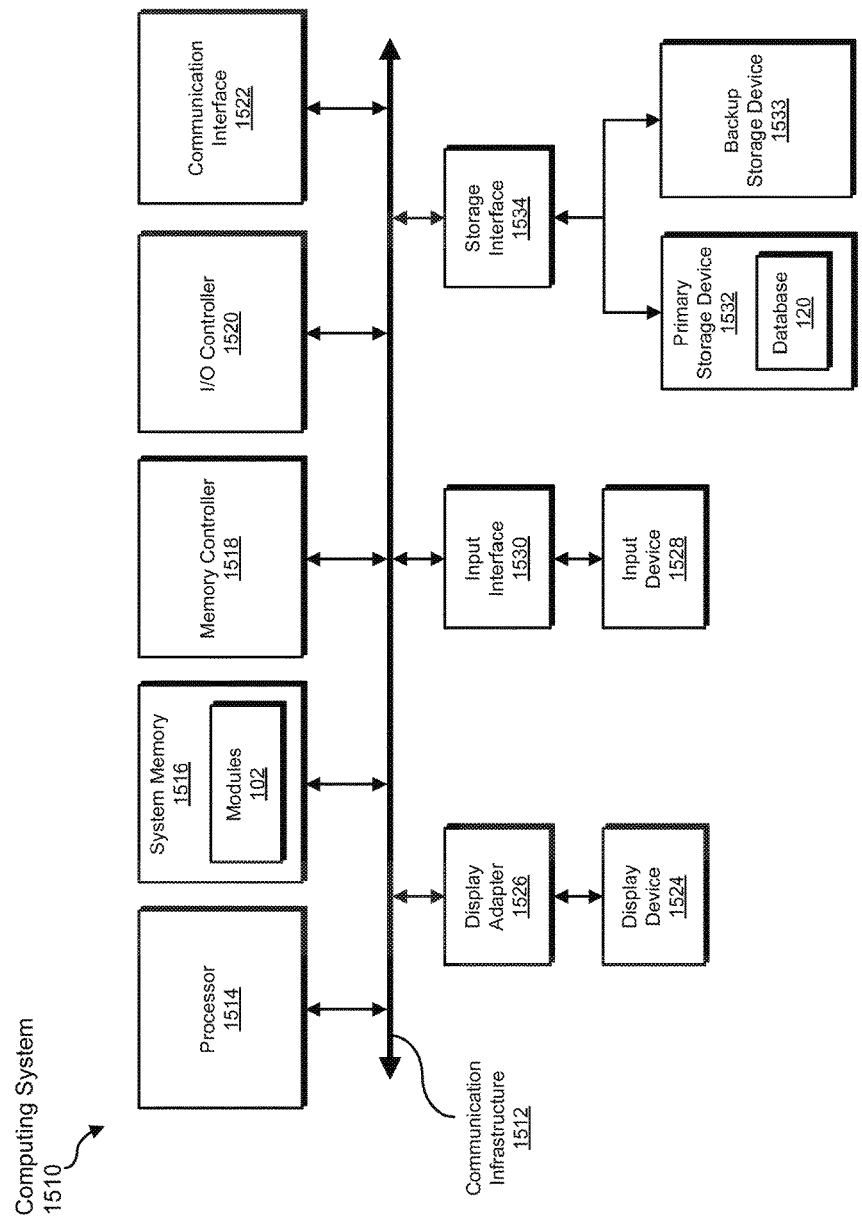
FIG. 15 is a block diagram of an exemplary computing system capable of implementing one or more of the embodiments described and/or illustrated herein.

FIG. 15 is a block diagram of an exemplary computing system 1510 capable of implementing one or more of the embodiments described and/or illustrated herein. For example, all or a portion of computing system 1510 may perform and/or be a means for performing, either alone or in combination with other elements, one or more of the gerund phrases from claims steps described herein. All or a portion of computing system 1510 may also perform and/or be a means for performing any other steps, methods, or processes described and/or illustrated herein.

Computing system 1510 broadly represents any single or multi-processor computing device or system capable of executing computer-readable instructions. Examples of computing system 1510 include, without limitation, workstations, laptops, client-side terminals, servers, distributed computing systems, handheld devices, or any other computing system or device. In its most basic configuration, computing system 1510 may include at least one processor 1514 and a system memory 1516.

Processor 1514 generally represents any type or form of processing unit capable of processing data or interpreting and executing instructions. In certain embodiments, processor 1514 may receive instructions from a software application or module. These instructions may cause processor 1514 to perform the functions of one or more of the exemplary embodiments described and/or illustrated herein.

System memory 1516 generally represents any type or form of volatile or non-volatile storage device or medium capable of storing data and/or other computer-readable instructions. Examples of system memory 1516 include, without limitation, random access memory (RAM), read only memory (ROM), flash memory, or any other suitable memory device. Although not required, in certain embodiments computing system 1510 may include both a volatile memory unit (such as, for example, system memory 1516) and a non-volatile storage device (such as, for example, primary storage device 1532, as described in detail below). In one example, one or more of modules 102 from FIG. 1 may be loaded into system memory 1516.

In certain embodiments, exemplary computing system 1510 may also include one or more components or elements in addition to processor 1514 and system memory 1516. For example, as illustrated in FIG. 15, computing system 1510 may include a memory controller 1518, an Input/Output (I/O) controller 1520, and a communication interface 1522, each of which may be interconnected via a communication infrastructure 1512. Communication infrastructure 1512 generally represents any type or form of infrastructure capable of facilitating communication between one or more components of a computing device. Examples of communication infrastructure 1512 include, without limitation, a communication bus (such as an ISA, PCI, PCIe, or similar bus) and a network.

Memory controller 1518 generally represents any type or form of device capable of handling memory or data or controlling communication between one or more components of computing system 1510. For example, in certain embodiments memory controller 1518 may control communication between processor 1514, system memory 1516, and I/O controller 1520 via communication infrastructure 1512.

I/O controller 1520 generally represents any type or form of module capable of coordinating and/or controlling the input and output functions of a computing device. For example, in certain embodiments I/O controller 1520 may control or facilitate transfer of data between one or more elements of computing system 1510, such as processor 1516, communication interface 1522, display adapter 1526, input interface 1530, and storage interface 1534.

Communication interface 1522 broadly represents any type or form of communication device or adapter capable of facilitating communication between exemplary computing system 1510 and one or more additional devices. For example, in certain embodiments communication interface 1522 may facilitate communication between computing system 1510 and a private or public network including additional computing systems. Examples of communication interface 1522 include, without limitation, a wired network interface (such as a network interface card), a wireless network interface (such as a wireless network interface card), a modem, and any other suitable interface. In at least one embodiment, communication interface 1522 may provide a direct connection to a remote server via a direct link to a network, such as the Internet. Communication interface 1522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1522 may also represent a host adapter configured to facilitate communication between computing system 1510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 1522 may also allow computing system 1510 to engage in distributed or remote computing. For example, communication interface 1522 may receive instructions from a remote device or send instructions to a remote device for execution.

As illustrated in FIG. 15, computing system 1510 may also include at least one display device 1524 coupled to communication infrastructure 1512 via a display adapter 1526. Display device 1524 generally represents any type or form of device capable of visually displaying information forwarded by display adapter 1526. Similarly, display adapter 1526 generally represents any type or form of device configured to forward graphics, text, and other data from communication infrastructure 1512 (or from a frame buffer, as known in the art) for display on display device 1524.

As illustrated in FIG. 15, exemplary computing system 1510 may also include at least one input device 1528 coupled to communication infrastructure 1512 via an input interface 1530. Input device 1528 generally represents any type or form of input device capable of providing input, either computer or human generated, to exemplary computing system 1510. Examples of input device 1528 include, without limitation, a keyboard, a pointing device, a speech recognition device, or any other input device.

As illustrated in FIG. 15, exemplary computing system 1510 may also include a primary storage device 1532 and a backup storage device 1533 coupled to communication infrastructure 1512 via a storage interface 1534. Storage devices 1532 and 1533 generally represent any type or form of storage device or medium capable of storing data and/or other computer-readable instructions. For example, storage devices 1532 and 1533 may be a magnetic disk drive (e.g., a so-called hard drive), a solid state drive, a floppy disk drive, a magnetic tape drive, an optical disk drive, a flash drive, or the like. Storage interface 1534 generally represents any type or form of interface or device for transferring data between storage devices 1532 and 1533 and other components of computing system 1510. In one example, databases shown in FIGS. 1-3 may be stored in primary storage device 1532.

In certain embodiments, storage devices 1532 and 1533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1532 and 1533 may also include other similar structures or devices for allowing computer software, data, or other computer-readable instructions to be loaded into computing system 1510. For example, storage devices 1532 and 1533 may be configured to read and write software, data, or other computer-readable information. Storage devices 1532 and 1533 may also be a part of computing system 1510 or may be a separate device accessed through other interface systems.

Many other devices or subsystems may be connected to computing system 1510. Conversely, all of the components and devices illustrated in FIG. 15 need not be present to practice the embodiments described and/or illustrated herein. The devices and subsystems referenced above may also be interconnected in different ways from that shown in FIG. 15. Computing system 1510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 1510. All or a portion of the computer program stored on the computer-readable-storage medium may then be stored in system memory 1516 and/or various portions of storage devices 1532 and 1533. When executed by processor 1514, a computer program loaded into computing system 1510 may cause processor 1514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1510 may be configured as an application specific integrated circuit (ASIC) adapted to implement one or more of the exemplary embodiments disclosed herein.

Figure 16:
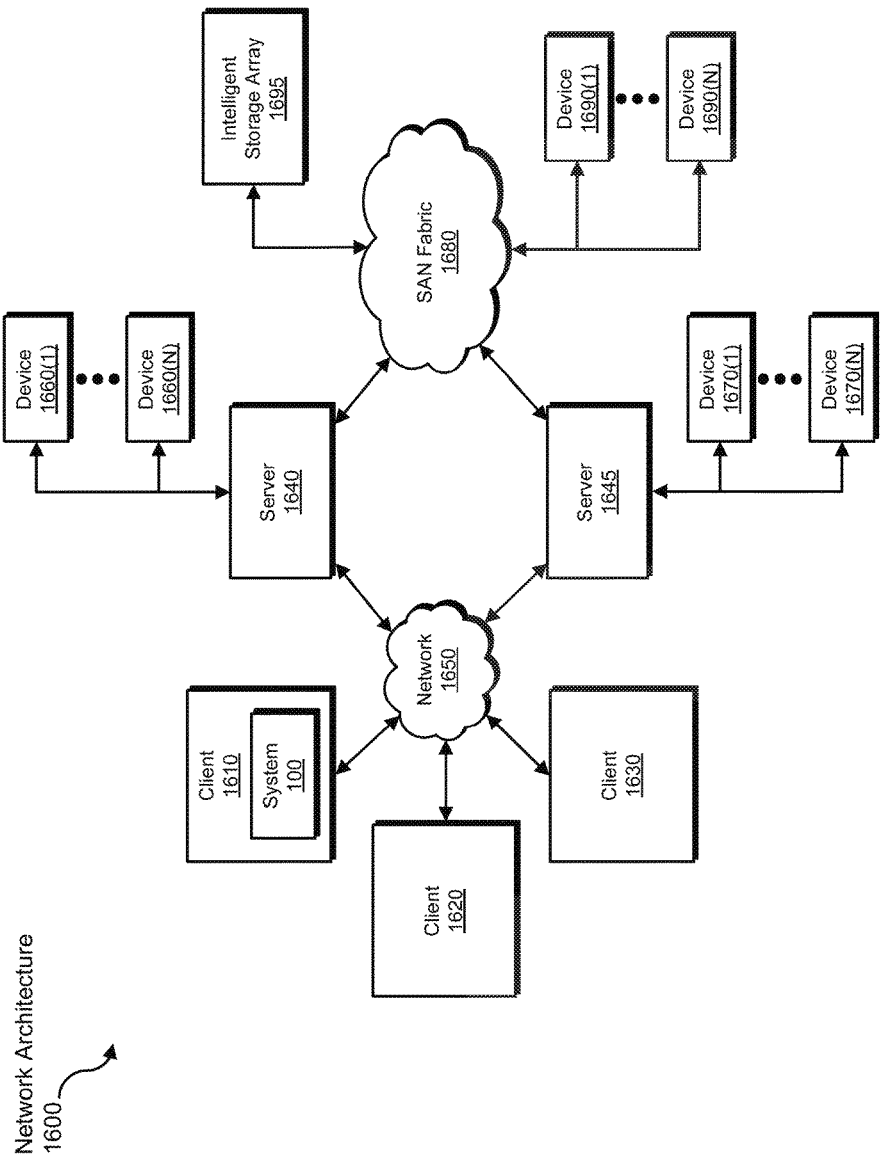
FIG. 16 is a block diagram of an exemplary computing network capable of implementing one or more of the embodiments described and/or illustrated herein.

FIG. 16 is a block diagram of an exemplary network architecture 1600 in which client systems 1610, 1620, and 1630 and servers 1640 and 1645 may be coupled to a network 1650. As detailed above, all or a portion of network architecture 1600 may perform and/or be a means for performing, either alone or in combination with other elements, one or more of the detecting, generating, associating, identifying, appending, routing, determining, receiving, and/or analyzing steps disclosed herein. All or a portion of network architecture 1600 may also be used to perform and/or be a means for performing other steps and features set forth in the instant disclosure.

Client systems 1610, 1620, and 1630 generally represent any type or form of computing device or system, such as exemplary computing system 1510 in FIG. 15. Similarly, servers 1640 and 1645 generally represent computing devices or systems, such as application servers or database servers, configured to provide various database services and/or run certain software applications. Network 1650 generally represents any telecommunication or computer network including, for example, an intranet, a wide area network (WAN), a local area network (LAN), a personal area network (PAN), or the Internet. In one example, client systems 1610, 1620, and/or 1630 and/or servers 1640 and/or 1645 may include all or a portion of systems 100, 200, and/or 300 from FIGS. 1-3.

As illustrated in FIG. 16, one or more storage devices 1660(1)-(N) may be directly attached to server 1640. Similarly, one or more storage devices 1670(1)-(N) may be directly attached to server 1645. Storage devices 1660(1)-(N) and storage devices 1670(1)-(N) generally represent any type or form of storage device or medium capable of storing data and/or other computer-readable instructions. In certain embodiments, storage devices 1660(1)-(N) and storage devices 1670(1)-(N) may represent network-attached storage (NAS) devices configured to communicate with servers 1640 and 1645 using various protocols, such as NFS, SMB, or CIFS.

Servers 1640 and 1645 may also be connected to a storage area network (SAN) fabric 1680. SAN fabric 1680 generally represents any type or form of computer network or architecture capable of facilitating communication between a plurality of storage devices. SAN fabric 1680 may facilitate communication between servers 1640 and 1645 and a plurality of storage devices 1690(1)-(N) and/or an intelligent storage array 1695. SAN fabric 1680 may also facilitate, via network 1650 and servers 1640 and 1645, communication between client systems 1610, 1620, and 1630 and storage devices 1690(1)-(N) and/or intelligent storage array 1695 in such a manner that devices 1690(1)-(N) and array 1695 appear as locally attached devices to client systems 1610, 1620, and 1630. As with storage devices 1660(1)-(N) and storage devices 1670(1)-(N), storage devices 1690(1)-(N) and intelligent storage array 1695 generally represent any type or form of storage device or medium capable of storing data and/or other computer-readable instructions.

In certain embodiments, and with reference to exemplary computing system 1510 of FIG. 15, a communication interface, such as communication interface 1522 in FIG. 15, may be used to provide connectivity between each client system 1610, 1620, and 1630 and network 1650. Client systems 1610, 1620, and 1630 may be able to access information on server 1640 or 1645 using, for example, a web browser or other client software. Such software may allow client systems 1610, 1620, and 1630 to access data hosted by server 1640, server 1645, storage devices 1660(1)-(N), storage devices 1670(1)-(N), storage devices 1690(1)-(N), or intelligent storage array 1695. Although FIG. 16 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1640, server 1645, storage devices 1660(1)-(N), storage devices 1670(1)-(N), storage devices 1690(1)-(N), intelligent storage array 1695, or any combination thereof. All or a portion of one or more of the exemplary embodiments disclosed herein may also be encoded as a computer program, stored in server 1640, run by server 1645, and distributed to client systems 1610, 1620, and 1630 over network 1650.

As detailed above, computing system 1510 and/or one or more components of network architecture 1600 may perform and/or be a means for performing, either alone or in combination with other elements, one or more steps of an exemplary method for enhancement of user data derived from digital communications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary systems 100, 200, 400, 500, 600, and/or 900 in FIGS. 1, 2, 4-6, and 9 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform data, physical devices, and/or representations of physical device from one form to another.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for enhancing and utilizing user data derived from digital interactions, at least a portion of the method being performed by a computing device comprising at least one processor, the method comprising:

delivering a viewable issue-specific communication to a first user, the issue-specific communication advertising information and a predefined character string associated with a first issue;

receiving, at an aggregation point comprising a database comprising at least one non-transitory computer-readable storage medium and configured to receive and aggregate user data from a plurality of sources, a user communication initiated via input by the first user into a graphical user interface of a client side application on a first computing device and transmitted from the first computing device to the aggregation point, the user communication including the predefined character string;

storing a record of the user communication at the database;

determining a path and attributes of the path utilized to transmit the submission;

determining attributes of the user communication, the first computing device, and the client side application;

identifying, based on the attributes of the user communication and the predefined character string contained in the body of the user communication, that the user communication is a response in action to the issue-specific communication delivered to the first user;

generating a first dataset associated with the first user by:
  associating the record of the user communication with each of data indicating the path utilized to transmit the user communication, the attributes of the first computing device, and the attributes of the client side application;
  associating the predefined issue-specific data element with the user communication;

storing the first dataset at the database;

generating an identity data model based on data in the first dataset and one or more data elements predictive of correlations based on attributes in the first dataset;

generating an identity dataset associated with the first user based on the identity data model by:
  searching one or more datasets for additional data to be associated with data elements of the first dataset, the data elements including the attributes of the path utilized to transmit the user communication, the attributes of the first computing device, the attributes of the client side application, and attributes of the first issue, the additional data correlating to attributes predictive of similarities between the first dataset and the additional data;
  analyzing the additional data from the one or more datasets based on at least one of characteristics and source of the additional data to determine correlations between the additional data from the one or more datasets and each of the attributes of the path utilized to transmit the user communication, the attributes of the first computing device, the attributes of the client side application, and the attributes of the first issue;
  associating the additional data from the one or more datasets with the first dataset based on the correlations between the additional data from the one or more datasets and each of the attributes of the path utilized to transmit the user communication, the attributes of the first computing device, the attributes of the client side application, and the attributes of the first issue;

appending the additional data from the one or more datasets to the first dataset to generate the identity dataset;

storing the identity dataset at the database.

2. The method of claim 1, wherein:
the identity dataset comprises at least one of:
linked data stored in multiple databases including the database;
linked data stored in multiple storage devices;
linked data accessible by multiple computing devices including the computing device;
linked data accessible by a distributed computing system.

3. The method of claim 1, wherein a distributed computing system performs one of database functions and data model generation.

4. The method of claim 1, wherein at least a portion of the method is performed by a distributed computing system.

5. The method of claim 1, wherein input into a user interface is used to at least one of generate, manipulate, and adjust at least one of the identity data model and the identity dataset.

6. The method of claim 1, wherein the identity data model is generated based on a combination of any of:
cluster analysis;
attribute correlation analysis;
attribute weighting;
attribute co-occurrence analysis;
attribute frequency analysis;
identifying patterns with the first dataset;
identifying targeting criteria;
identifying attribute clusters;
identifying attribute correlations;
applying weighting to attribute data;
identifying attribute frequency patterns;
inclusion of additional data into a pre-existing data model;
predictive analysis;
iterative analysis;
iterative testing;
formatting data;
sorting stored;
filtering stored data;
selecting stored data;
data input by user interface;
data generated by iterative data model testing;
inclusion of new data to an existing data model.

7. The method of claim 1, wherein the identity data model comprises data stored at the database and associated with at least one of:
a voter targeting profile;
a consumer targeting profile;
a prospective purchaser targeting profile;
a behavioral targeting profile;
a contributor targeting profile;
a prospective donor targeting profile;
a predictive profile;
an issue specific targeting profile;
a transmission data targeting profile;
a transmission channel targeting profile;
a transmission path targeting profile;
an iteratively generated profile;
a contributor targeting profile;
an internet protocol address targeting profile;
a device identification targeting profile;
a social media targeting profile;
an issue specific invitation targeting profile;
a submission data attribute targeting profile;
formatted data;
sorted data;
filtered data;
selected data;
a formula for associating additional data generated by analysis of the first dataset;
a formula for associating additional data generated by analysis of one or one or more modeled datasets.

8. The method of claim 1, wherein the identity dataset comprises data stored at the database and associated with one or more of:
information input into a client side application interface;
user records that meet profiling criteria;
user records that meet clustering criteria;
user records that meet targeting criteria;
user records that share similarities between attributes of the first user and attributes of the additional users;
attribute data that meet profiling criteria;
attribute data that meet clustering criteria;
attribute data that meet targeting criteria;
data transformed by the method for targeting, profiling, clustering, or analysis;
correlated attribute data;
data grouped by attribute;
data grouped by attribute correlations;
data grouped by iterative analysis;
behavioral data;
consumer data;
linguistic data;
sentiment data;
voter data;
voting data;
political contribution data;
charitable contribution data;
political data;
personal data;
polling data;
survey data;
purchase data;
financial transaction data;
transmission data;
channel data;
path data;
user submission data;
digital submission data;
internet protocol address data;
device identification data;
user name data;
screen name data;
handle data;
membership number data;
account number data.

9. The method of claim 1, wherein at least a portion of the identity dataset is generated based on a response to an information request that is generated based on the first dataset.

10. The method of claim 1, wherein at least a portion of the identity dataset is iteratively generated based on a response to an information request that is generated based on the identity dataset.

11. The method of claim 1, wherein at least a portion of the identity data model is iteratively generated based on a response to an information request that is generated based on a data model.

12. The method of claim 1, further comprising generating, based on correlations within the identity data model, at least one of:
   voter targeting criteria;
   consumer targeting criteria;
   contributor targeting criteria;
   internet protocol address targeting criteria;
   device identification targeting criteria;
   message targeting criteria;
   behavioral targeting criteria;
   semantic targeting criteria
   lingual targeting criteria;
   sentiment targeting criteria;
   social media targeting criteria.

13. The method of claim 1, further comprising analyzing at least a portion of one or more additional datasets in view of at least one of:
   the identity dataset;
   a data model associated with at least one other user of another computing device.

14. The method of claim 1, wherein the first computing device comprises at least one of:
   a handheld computing device;
   a mobile computing device;
   a tablet computing device;
   a wearable computing device;
   a portable computing device;
   a fixed computing device;
   a physiologically embedded computing device;
   a biologically integrated computing device;
   a touchless data transmittal device.

15. The method of claim 1, further comprising routing the user communication through a messaging service, the messaging service comprising at least one of:
   a short message service;
   a multimedia messaging service;
   a smart messaging service;
   an extended message service;
   an instant messaging service;
   an email service;
   a message transmittal application;
   a message response capture application;
   a social media application programming interface;
   a share-to-donate application programming interface;
   a post-to-donate application programming interface;
   a tweet-to-donate application programming interface;
   a social media stream capture application;
   a user post application;
   a user response application;
   a user sharing application;
   a touchless data transmittal application.

16. The method of claim 1, wherein the user communication is transmitted from the first computing device to the aggregation point via at least one of a wireless data transmission service and a wireless data transmission provider.

17. The method of claim 1, wherein the user communication is transmitted from the first computing device to the aggregation point via an application programming interface.

18. The method of claim 1, wherein the user communication is transmitted via digital communication data and comprises at least one of:
   a text-to-give transaction;
   a text-to-donate transaction;
   a text-to-purchase transaction;
   a text-to-contribute transaction;
   a text-to-sign-up transaction;
   a text-to-purchase transaction;
   a text-to-vote transaction;
   a text-to-be-billed transaction;
   a text-to-join transaction;
   a text-to-opt-in transaction;
   a text-to-respond transaction;
   a share-to-donate transaction;
   a post-to-donate transaction;
   a tweet-to-donate transaction;
   a respond-to-donate transaction;
   a respond-to-purchase transaction;
   a tweet-to-purchase transaction;
   an online post;
   an online message;
   a social media post;
   a social media message;
   a direct message;
   an application to application message;
   a tweet-to-donate post;
   an input interface;
   an online posting application;
   an online messaging application;
   a social media posting application;
   a social media messaging application;
   a direct messaging application;
   an application to application messaging application;
   a post-to-donate application;
   a tweet-to-donate post application;
   an input interface application.

19. The method of claim 1, wherein the issue-specific communication is transmitted via digital communication data and comprises at least one of a television advertisement, a radio advertisement, an on-line advertisement, an email advertisement, a mobile messaging advertisement, a print advertisement, a newspaper advertisement, a mail advertisement, a billboard advertisement, a vendor product display, and a media display.

20. The method of claim 1, wherein the issue-specific communication is transmitted via digital communication data and advertises information concerning at least one of an issue, a cause, a topic, an individual, an entity, an event, a product, an organization, a good, and a service.

21. The method of claim 1, further comprising:
   obtaining behavioral data for the first user;
   determining that the first user belongs to a target group of individuals based on the behavioral data.

22. The method of claim 21, further comprising sending, via digital communication data, a targeted communication directed to the target group of individuals to the first user, wherein the targeted communication comprises one or more of:
   an advertisement;
   an email message;
   a text message;
   a multimedia messaging service message;
   a short messaging service message;
   a social media message;
   a social media post;
   a video message;
   a request for a political contribution;
   a request for a charitable donation.

23. The method of claim 21, further comprising modeling data of the target group of individuals, including the behavioral data of the first user, to identify at least one of:
   additional correlations between one or more user attributes;
   preferences of individuals in the target groups of individuals;

additional issues potentially of interest to individuals in the target groups of individuals.

24. A system for enhancing and utilizing user data derived from digital interactions, the system comprising:
    at least one computing device that delivers a viewable issue-specific communication to a first user, the issue-specific communication advertising information and a predefined character string associated with a first issue;
    a receiving module that receives, at an aggregation point configured to receive and aggregate user data from a plurality of sources, a user communication initiated via input by the first user into a graphical user interface of a client side application on a first computing device and transmitted from the first computing device to the aggregation point, the user communication including the predefined character string;
    a database comprising at least one non-transitory computer-readable storage medium that stores a record of the user communication;
    a determining module that determines:
        a path and attributes of the path utilized to transmit the submission;
        attributes of the user communication, the first computing device, and the client side application;
    an identifying module that identifies, based on the attributes of the user communication and the predefined character string contained in the body of the user communication, that the user communication is a response in action to the issue-specific communication delivered to the first user;
    a generating module that:
        generates a first dataset associated with the first user by:
            associating the record of the user communication with each of data indicating the path utilized to transmit the user communication, the attributes of the first computing device, and the attributes of the client side application;
            associating the predefined issue-specific data element with the user communication;
        generates an identity data model based on data in the first dataset and one or more data elements predictive of correlations based on attributes in the first dataset;
        generates an identity dataset associated with the first user based on the identity data model by:
            searching one or more datasets for additional data to be associated with data elements of the first dataset, the data elements including the attributes of the path utilized to transmit the user communication, the attributes of the first computing device, the attributes of the client side application, and attributes of the first issue, the additional data correlating to attributes predictive of similarities between the first dataset and the additional data;
            analyzing the additional data from the one or more datasets based on at least one of characteristics and source of the additional data to determine correlations between the additional data from the one or more datasets and each of the attributes of the path utilized to transmit the user communication, the attributes of the first computing device, the attributes of the client side application, and the attributes of the first issue;
            associating the additional data from the one or more datasets with the first dataset based on the correlations between the additional data from the one or more datasets and each of the attributes of the path utilized to transmit the user communication, the attributes of the first computing device, the attributes of the client side application, and the attributes of the first issue;
            appending the additional data from the one or more datasets to the first dataset to generate the identity dataset;
    at least one physical processor configured to execute the determining module, the identifying module, and the generating module;
    wherein the database:
        stores the first dataset;
        stores the identity dataset.

25. The system of claim 24, wherein the determining module, the identifying module, and the generating module are executed using distributed computing architecture.

26. The system of claim 24, wherein instructions for the determining module, the identifying module, and the generating module are executed by separate computing systems and transmitted via application programming interface.

27. The system of claim 24, wherein at least one of the first dataset, the identity data model, and the identity dataset is exported to an external computing device that is external to the system.

28. The system of claim 24, wherein at least one of the first dataset, the identity data model, and the identity dataset is accessed or manipulated via a user interface.

29. A non-transitory computer-readable-storage medium comprising one or more computer-readable instructions that, when executed by at least one processor of a computing device, cause the computing device to:
    deliver a viewable issue-specific communication to a first user, the issue-specific communication advertising information and a predefined character string associated with a first issue;
    receive, at an aggregation point comprising a database comprising at least one non-transitory computer-readable storage medium and configured to receive and aggregate user data from a plurality of sources, a user communication initiated via input by the first user into a graphical user interface of a client side application on a first computing device and transmitted from the first computing device to the aggregation point, the user communication including the predefined character string;
    store a record of the user communication at the database;
    determine a path and attributes of the path utilized to transmit the submission;
    determine attributes of the user communication, the first computing device, and the client side application;
    identify, based on the attributes of the user communication and the predefined character string contained in the body of the user communication, that the user communication is a response in action to the issue-specific communication delivered to the first user;
    generate a first dataset associated with the first user by:
        associating the record of the user communication with each of data indicating the path utilized to transmit the user communication, the attributes of the first computing device, and the attributes of the client side application;
        associating the predefined issue-specific data element with the user communication;
    store the first dataset at the database;
    generate an identity data model based on data in the first dataset and one or more data elements predictive of correlations based on attributes in the first dataset;

generate an identity dataset associated with the first user based on the identity data model by:
  searching one or more datasets for additional data to be associated with data elements of the first dataset, the data elements including the attributes of the path utilized to transmit the user communication, the attributes of the first computing device, the attributes of the client side application, and attributes of the first issue, the additional data correlating to attributes predictive of similarities between the first dataset and the additional data;
  analyzing the additional data from the one or more datasets based on at least one of characteristics and source of the additional data to determine correlations between the additional data from the one or more datasets and each of the attributes of the path utilized to transmit the user communication, the attributes of the first computing device, the attributes of the client side application, and the attributes of the first issue;
  associating the additional data from the one or more datasets with the first dataset based on the correlations between the additional data from the one or more datasets and each of the attributes of the path utilized to transmit the user communication, the attributes of the first computing device, the attributes of the client side application, and the attributes of the first issue;
  appending the additional data from the one or more datasets to the first dataset to generate the identity dataset;
store the identity dataset at the database.

* * * * *